US012672661B2

(12) United States Patent
Badri et al.

(10) Patent No.: US 12,672,661 B2
(45) Date of Patent: Jul. 7, 2026

(54) PET FOOD COMPOSITIONS

(71) Applicant: Hill's Pet Nutrition, Inc., Topeka, KS (US)

(72) Inventors: Dayakar Badri, Lawrence, KS (US); Dennis Jewell, Lawrence, KS (US)

(73) Assignee: Hill's Pet Nutrition, Inc., Overland Park, KS (US)

( * ) Notice: Subject to any disclaimer, the term of this patent is extended or adjusted under 35 U.S.C. 154(b) by 777 days.

(21) Appl. No.: 17/597,340

(22) PCT Filed: Jul. 9, 2019

(86) PCT No.: PCT/US2019/041036
§ 371 (c)(1),
(2) Date: Jan. 4, 2022

(87) PCT Pub. No.: WO2021/006885
PCT Pub. Date: Jan. 14, 2021

(65) Prior Publication Data
US 2022/0248716 A1     Aug. 11, 2022

(51) Int. Cl.
*A23K 20/147*     (2016.01)
*A23K 20/163*     (2016.01)
*A23K 50/42*     (2016.01)
*A23K 50/48*     (2016.01)

(52) U.S. Cl.
CPC .......... *A23K 20/147* (2016.05); *A23K 20/163* (2016.05); *A23K 50/42* (2016.05); *A23K 50/48* (2016.05)

(58) Field of Classification Search
CPC .... A23K 20/147; A23K 20/163; A23K 50/42; A23K 50/48
See application file for complete search history.

(56) References Cited

U.S. PATENT DOCUMENTS

| | | | |
|---|---|---|---|
| 7,153,528 B2 | 12/2006 | Malleshi et al. | |
| 7,722,905 B2 * | 5/2010 | Khoo ..................... | A23K 20/30 |
| | | | 424/756 |
| 8,691,792 B2 * | 4/2014 | Xu ........................... | A61P 1/00 |
| | | | 514/54 |
| 10,583,164 B2 | 3/2020 | Khoo et al. | |

(Continued)

FOREIGN PATENT DOCUMENTS

| | | |
|---|---|---|
| EP | 2493467 | 5/2017 |
| JP | 2003210115 | 7/2003 |

(Continued)

OTHER PUBLICATIONS

Lu et al. "Serum Metabolomics in a Helicobacter hepaticus Mouse Model of Inflammatory Bowel Disease Reveal Important Changes in the Microbiome, Serum Peptides, and Intermediary Metabolism" J. Proteome Res. (2012), 11, 4916-4926.

(Continued)

*Primary Examiner* — Stephanie A Kohler

(57) ABSTRACT

Described herein are pet food compositions comprising crude protein, carbohydrate, and dietary fiber consisting of insoluble fiber and soluble fiber is designed to shift the intestinal tryptophan metabolism of the companion animal from kynurenine pathway to indole pathway to produce indole derivatives. Methods of making and using the compositions are also described.

14 Claims, 9 Drawing Sheets

(56) References Cited

U.S. PATENT DOCUMENTS

| | | | | |
|---|---|---|---|---|
| 2003/0138547 | A1 | 7/2003 | Bui et al. | |
| 2005/0112217 | A1* | 5/2005 | Khoo | A23K 10/30 |
| | | | | 424/756 |
| 2005/0249860 | A1 | 11/2005 | Martin et al. | |
| 2009/0028996 | A1 | 1/2009 | Yamka et al. | |
| 2011/0034411 | A1* | 2/2011 | Xu | A61K 31/721 |
| | | | | 514/23 |
| 2011/0123669 | A1* | 5/2011 | Yamka | A23D 9/013 |
| | | | | 426/601 |
| 2016/0073659 | A1* | 3/2016 | Zemel | A23K 20/10 |
| | | | | 426/302 |
| 2018/0177156 | A1 | 6/2018 | Heath et al. | |
| 2022/0007685 | A1* | 1/2022 | Badri | A23K 20/163 |
| 2023/0404951 | A1* | 12/2023 | Ephraim | A23K 20/163 |

FOREIGN PATENT DOCUMENTS

| | | |
|---|---|---|
| JP | 2013501044 | 1/2013 |
| JP | 2014152118 | 8/2014 |
| JP | 2017002053 | 1/2017 |
| JP | 2019500047 | 1/2019 |
| WO | 2017/117091 | 7/2017 |

OTHER PUBLICATIONS

Tuomainen et al. "Associations of serum indolepropionic acid, a gut microbiota metabolite, with type 2 diabetes and low-grade inflammation in high-risk individuals" Nutrition and Diabetes (2018) 8:35.

Wan et al. "Effects of dietary fat on gut microbiota and faecal metabolites, and their relationship with cardiometabolic risk factors: a 6-month randomised controlled-feeding trial" Gut (2019): 68: 1417-1429.

Zhao et al. "Magnolol, a Natural Polyphenol, Attenuates Dextran Sulfate Sodium-Induced Colitis in Mice" Molecules (2017), 22, 1218.

Agus et al., 2018, "Gut Microbiota Regulation of Tryptophan Metabolism in Health and Disease," Cell Host & Microbe 23(6):716-724.

Badawy, 2017, "Kynurenine Pathway of Tryptophan Metabolism: Regulatory and Functional Aspects," International Journal of Tryptophan Research vol. 10:1-20.

De Mello et al., 2017, "Indolepropionic acid and novel lipid metabolites are associated with a lower risk of type 2 diabetes in the Finnish Diabetes Prevention Study," Scientific Reports 7(1).

International Search Report and the Written Opinion of the International Searching Authority issued in International Application PCT/US2019/041036 mailed Jun. 23, 2020.

Le Floc'h et al., 2010, "Tryptophan metabolism, from nutrition to potential therapeutic applications, " Amino Acids; the Forum for Amino Acid and Protein Research, Springer-Verlag, VI, 41(5):1195-1205.

Puurunen et al., 2016, "A non-targeted metabolite profiling pilot study suggests that tryptophan and lipid metabolisms are linked with ADHD-like behaviours in dogs," Behavioral and Brain Functions 12(1):27.

Puurunen et al., 2016, "Non-targeted metabolite profiling reveals changes in oxidative stress, tryptophan and lipid metabolisms in fearful dogs," Behavioral and Brain Functions 12(1):7.

Hill's Prescription Diet w/d Canine [retrieved from internet on Jun. 29, 2023], https://web.archive.org/web/20180325201043/https:/www.hillspet.com.au/dog-food/pd-wd-canine-dry, published on Mar. 25, 2018 as per Wayback Machine.

Kim et al., 2017, "Indoxyl sulfate (IS)-mediated immune dysfunction provokes endothelial damage in patients with end-stage renal disease (ESRD)", Scientific Reports, 7:1-16.

* cited by examiner

PET FOOD COMPOSITIONS

BACKGROUND

Tryptophan metabolism, from nutrition to potential therapeutic applications, have been reviewed by N. Le Floc'h et al. in *Amino Acids* 2011, vol. 41, iss. 5, pp. 1195-1205. Tryptophan is an indispensable amino acid that should to be supplied by dietary protein. Apart from its incorporation into body proteins, tryptophan is the precursor for serotonin, an important neuromediator, and for kynurenine, an intermediary metabolite of a complex metabolic pathway ending with niacin, $CO_2$, and kynurenic and xanthurenic acids. Tryptophan metabolism within different tissues is associated with numerous physiological functions. The liver regulates tryptophan homeostasis through degrading tryptophan in excess. Tryptophan degradation into kynurenine by immune cells plays a crucial role in the regulation of immune response during infections, inflammations and pregnancy. Serotonin is synthesized from tryptophan in the gut and also in the brain, where tryptophan availability is known to influence the sensitivity to mood disorders.

Regulatory and functional aspects of kynurenine pathway of tryptophan metabolism is discussed by A. A. Badawy in *Int. J. Tryptophan Res.* 2017, doi: 10.1177/1178646917691938. Kynurenine (K) pathway (KP) of tryptophan (Trp) degradation accounts for ~95% of dietary Tip degradation, of which 90% is attributed to the hepatic kynurenine pathway. During immune activation, the minor extrahepatic kynurenine pathway plays a more active role. The kynurenine pathway is rate-limited by its first enzyme Trp 2,3-dioxygenase (TDO), in liver and indoleamine 2,3-dioxygenase (IDO) elsewhere. TDO is regulated by glucocorticoid induction, substrate activation and stabilization by Trp, cofactor activation by heme, and end-product inhibition by reduced nicotinamide adenine dinucleotide (phosphate). IDO is regulated by IFN-γ and other cytokines and by nitric oxide. The kynurenine pathway disposes of excess Trp, controls hepatic heme synthesis and Trp availability for cerebral serotonin synthesis, and produces immunoregulatory and neuroactive metabolites, the B3 "vitamin" nicotinic acid, and oxidized nicotinamide adenine dinucleotide. Various KP enzymes are undermined in disease and are targeted for therapy of conditions ranging from immunological neurological, and neurodegenerative conditions to cancer.

A process for preparation of hypoglycemic foods and formulations thereof is disclosed in US Patent Application Publication NO. 2004/0191377. The process for preparation of hypoglycemic foods and formulations thereof, useful as snacks, wholesome or supplementary foods, especially to the Type II diabetics, and a hypoglycemic foods and formulations product of composition with concentration of toasted cereals is ranging between 50-60%, concentration of toasted legumes is ranging between 6-12%, concentration of soy is ranging between 7-15%, concentration of fenugreek is ranging between 2-6%, concentration of spice mix is ranging between 3-7%, concentration of amla fruit pulp is ranging between 0.5-2%, concentration of *Garcinia combogia* rinds is ranging between 1.5 to 3%, concentration of dry skimmed milk is ranging between 3-6%, concentration of edible oil is ranging between 2-6%, and concentration of vitamin and mineral premix is ranging between 1-3%.

Functional fiber flour product and method for making the same are disclosed in US Patent Application Publication No. 2005/0249860. That publication relates to a functional fiber flour product for use in foods, beverages, nutritional products and dietary supplements. The disclosure includes a functional fiber flour product made from oilseeds and comprises soluble and insoluble dietary fibers polyunsaturated fatty acids, monounsaturated fatty acids, protein, lignans, and low amounts of digestible carbohydrates and saturated fat. Properties of the disclosded invention are useful in enhancing mixing, sheeting, extrusion, baking, frying and roasting characteristics of human food and beverage products and animal feed products without adversely affecting palatability or appearance attributes; properties also include considerable extended shelf life compared to prior art functional fiber products. The disclosure also includes a process for making the functional fiber flour product using high pressure and high temperature mixing and extrusion equipment.

Gut microbiota regulation of tryptophan metabolism in health and disease is discussed by A. Agus et al. in *Cell Host Microbe* 2018 Jun. 13; vol. 23, iss. 6, pp. 716-724. The gut microbiota is a crucial actor in human physiology. Many of these effects are mediated by metabolites that are either produced by the microbes m derived from the transformation of environmental or host molecules. Among the array of metabolites at the interface between these microorganisms and the host is the essential aromatic amino acid tryptophan (Trp). In the gut, the three major Trp metabolism pathways leading to serotonin (5-hydroxytryptamine), kynurenine (Kyn), and indole derivatives are under the direct or indirect control of the microbiota. Deciphering the complex equilibrium between these pathways will facilitate a better understanding of the pathogenesis of human diseases and open therapeutic opportunities.

Abnormal kynurenine pathway of tryptophan catabolism in cardiovascular diseases is discussed by P. Song et al. in *Cell. Mol. Life Sci.* 2017, vol. 74, iss. 16, pp. 2899-2916. Kynurenine pathway (KP) is the primary path of tryptophan (Trp) catabolism in most mammalian cells. The KP generates several bioactive catabolites, such as kynurenine (Kyn), kynurenic acid (KA), 3-hydroxykynurenine (3- HK), xanthurenic acid (XA), and 3-hydroxyanthranilic acid (3-HAA). Increased catabolite concentrations in serum are associated with several cardiovascular diseases (CVD), including heart disease, atherosclerosis, and endothelial dysfunction, as well as their risk factors, including hypertension, diabetes, obesity, and aging. The first catabolic step in KP is primarily controlled by indoleamine 2,3-dioxygenase (IDO) and tryptophan 2,4-dioxygenase (TDO). Following this first step, the KP has two major branches, one branch is mediated by kynurenine 3-monooxygenase (KMO) and kynureninase (KYNU) and is responsible for the formation of 3-HK, 3-HAA, and quinolinic acid (QA); and another branch is controlled by kynurenine amino-transferase (KAT), which generates KA. Uncontrolled Trp catabolism has been demonstrated in distinct CVD, thus, understanding the underlying mechanisms by which regulates KP enzyme expression and activity is paramount. The recent advances on the effect of KP enzyme expression and activity in different tissues on the pathological mechanisms of specific CVD, KP is an inflammatory sensor and modulator in the cardiovascular system, and KP catabolites act as the potential biomarkers for CVD initiation and progression, are discussed. Moreover, the biochemical features of critical KP enzymes and principles of enzyme inhibitor development are disclosed, as well as the therapeutic potential of KP enzyme inhibitors against CVD is briefly discussed.

A non-targeted metabolite profiling pilot study suggested that tryptophan and lipid metabolisms are linked with ADHD-like behaviours in dogs, as published by J. Puurunen et al. in *Behav. Brain Funct.* 2016, 12:27. Attention deficit hyperactivity disorder (ADHD) is a prevalent and multifactorial neuropsychiatric disorder in the human population worldwide. Complex etiology and clinical heterogeneity have challenged the research, diagnostics and treatment of the disease. Hyperactive and impulsive behaviour has also been observed in dogs, and they could offer a physiologically relevant model for human ADHD. As a part of our ongoing study to understand the molecular etiology of canine anxiety traits, the study was aimed to pilot an approach to identify metabolic biomarkers in canine ADHD-like behaviours for research, diagnostics and treatment purposes. The authors collected fresh plasma samples from 22 German Shepherds with varying ADHD-like behaviours. All dogs were on the same controlled diet for 2 weeks prior to sampling. A liquid chromatography combined with mass spectrometry (LC-MS)-based non-targeted metabolite profiling was performed to identify plasma metabolites correlating with the ADHD-like behaviour of the dogs. 649 molecular features correlated with ADHD-like behavioural scores ($p_{raw}<0.05$), and three of them [sn-1 LysoPC(18:3), PC(18:3/18:2) and sn-1 LysoPE(18:2)] had significant correlations also after FDR correction ($p_{FDR}<0.05$), Phospholipids were found to negatively correlate with ADHD-like behavioural scores, whereas tryptophan metabolites 3-indolepropionic acid (IPA) and kynurenic acid (KYNA) had negative and positive correlations with ADHD-like behavioural scores, respectively. The study identified associations between canine ADHD-like behaviours and metabolites that are involved in lipid and tryptophan metabolisms. The identified metabolites share similarity with earlier findings in human and rodent ADHD models. However, a larger replication study is warranted to validate the discoveries prior to further studies to understand the biological role of the identified metabolites in canine ADHD-like behaviours.

Indoxyl sulfate (IS)-mediated immune dysfunction provokes endothelial damage in patients with end-stage renal disease (ESRD). H. Y. Kim et al., *Scientific Reports* 2017, vol. 7, Article no. 3057. Progressive renal failure causes uremia-related immune dysfunction, which features a chronic inflammatory milieu. Given the central role of end-stage renal disease (ESRD)-related immune dysfunction in the pathogenesis of cardiovascular diseases (CVDs), much attention has been focused on how uremic toxins affect cellular immunity and the mechanisms underlying pathogenesis of atherosclerosis in ESRD patients. In the reference, the authors investigated the characteristics of monocytes and CD4$^+$ T cells in ESRD patients and the immune responses induced by indoxyl sulfate (IS), a key uremic toxin, in order to explore the pathogenic effects of these cells on vascular endothelial cells. In ESRD patients, monocytes respond to IS through the aryl hydrocarbon receptor (AhR) and consequently produce increased levels of TNF-$\alpha$. Upon stimulation with TNF-$\alpha$, human vascular endothelial cells produce copious amounts of CX3CL1, a chemokine ligand of CX3CR1 that is highly expressed on CD4$^+$CD28$^-$ T cells, the predominantly expanded cell type a ESRD patients. A migration assay showed that CD4$^+$CD28$^-$ T cells were preferentially recruited by CX3CL1. Moreover, activated CD4$^+$CD28$^-$ T cells exhibited cytotoxic capability allowing for the induction of apoptosis in HUVECs. Such findings suggest that in ESRD, IS-mediated immune dysfunction may cause vascular endothelial cell damage and thus, this toxin plays a pivotal role in the pathogenesis of CVD.

Indolepropionic acid and novel lipid metabolites are associated with a lower risk of type 2 diabetes in the Finnish Diabetes Prevention Study. V. D. de Mello et al. in *Sci. Rep.* 2017, vol. 7, Article no. 46337. Wide-scale profiling technologies including metabolomics broaden the possibility of novel discoveries related to the pathogenesis of type 2 diabetes (T2D). By applying non-targeted metabolomics approach, we investigated here whether serum metabolite profile predicts T2D in a well-characterized study population with impaired glucose tolerance by examining two groups of individuals who took part in the Finnish Diabetes Prevention Study (DPS); those who either early developed T2D (n=96) or did not convert to T2D within the 15-year follow-up (n=104). Several novel metabolites were associated with lower likelihood of developing T2D, including indole and lipid related metabolites. Higher indolepropionic acid was associated with reduced likelihood of T2D in the DPS. Interestingly, in those who remained free of T2 D, indolepropionic acid and various lipid species were associated with better insulin secretion and sensitivity, respectively. Furthermore, these metabolites were negatively correlated with low-grade inflammation, de Mello et al. replicated the association between indolepropionic acid and T2D risk in one Finnish and one Swedish population. de Mello et al. suggested that indolepropionic acid, a gut microbiota-produced metabolite, is a potential biomarker for the development of T2D that may mediate its protective effect by preservation of $\beta$-cell function. Novel lipid metabolites associated with T2D may exert their effects partly through enhancing insulin sensitivity.

Although many advances in the art of formulating pet food composition have been made with respect to improving its ability to treat diseases, many more challenges remain.

BRIEF SUMMARY

The present invention is directed to a dietary composition for a companion animal comprising crude protein, carbohydrate, and dietary fiber consisting of insoluble fiber and soluble fiber. Under one embodiment, the dietary composition is designed to shift the intestinal tryptophan metabolism of the companion animal from kynurenine pathway to indole pathway to produce indole derivatives.

One advantage of the composition of the present invention is that the diet comprising the composition shifts tryptophan metabolism in a pet. Another is that the diet comprising the composition shifts tryptophan metabolism in a way that is healthier for the pet. Further advantage is that the diet comprising the composition helps the health of a senior pet. Yet another advantage is that the diet comprising the composition helps the health of an anxious pet. Still another advantage is that the diet comprising the composition helps the GI health of a pet. Further still advantage is that the diet comprising the composition helps to alleviate IBD of a pet. It is surprising that the composition of the present invention exhibits these multiple useful effects.

One of the ingredients of the dietary composition of the present invention is crude protein. Crude protein may be supplied by any of a variety of sources known by those skilled in the art, including plant sources, animal sources, or both. Animal sources include, for example, meat, meat by-products, seafood, dairy, eggs, etc.

Another one of the ingredients of the dietary composition of the present invention is carbohydrate. The term "carbohydrate" as used herein includes polysaccharides (e.g., starches and dextrins) and sugars (e.g., sucrose, lactose, maltose, glucose, and fructose) that are metabolized for energy when hydrolyzed. Examples of carbohydrates include carbohydrates obtained a carbohydrate source selected from the group consisting corn, wheat, distiller's dried grain, corn starch, rice, corn gluten meal, and mixtures thereof.

Further one of the ingredients of the dietary composition of the present invention is dietary fiber. Dietary fiber refers to components of a plant which are resistant to digestion by an animal's digestive enzymes. Dietary fiber, or total dietary fiber, consists of insoluble fiber and soluble fiber.

The weight ratio of crude protein to carbohydrate is less than about 0.40:1. Under one embodiment, the weight ratio of crude protein to carbohydrate is between about 0.10:1 to about 0.40:1.

The weight ratio of insoluble fiber to soluble fiber is greater than about 3.5:1. Under one embodiment, the weight ratio of insoluble fiber to soluble fiber is between about 3.5:1 and about 10.0:1.

The weight ratio of total dietary fiber to crude protein is greater than about 0.70:1. Under one embodiment, the weight ratio of total dietary fiber to crude protein is between about 0.70:1 and about 4.0:1

Further, the present invention is also directed to a dietary composition for a companion animal comprising crude protein, carbohydrate, and dietary fiber consisting of insoluble fiber and soluble fiber; wherein the weight ratio of crude protein to carbohydrate is less than about 0.40:1, the weight ratio of insoluble fiber to soluble fiber is greater than about 3.5:1, and the weight ratio of total dietary fiber to crude protein is greater than about 0.70:1.

The present invention is also directed to a dietary composition for a companion animal comprising crude protein, carbohydrate, dietary fiber consisting of insoluble fiber and soluble fiber, and an additional ingredient. The additional ingredient is selected from the group consisting of crude fat, crude fiber, ash, and moisture. Under one embodiment, more than one of these ingredients is present in the dietary composition.

The present invention is also directed to a nutritionally complete pet food comprising a dietary composition for a companion animal comprising crude protein, carbohydrate, and dietary fiber consisting of insoluble fiber and soluble fiber, wherein the composition shifts the intestinal tryptophan metabolism of the animal from kynurenine pathway to indole pathway to produce indole derivatives.

The present invention is also directed to a nutritionally complete pet food comprising a dietary composition for a companion animal comprising crude protein, carbohydrate, and dietary fiber consisting of insoluble fiber and soluble fiber, wherein the weight ratio of crude protein to carbohydrate is less than about 0.40:1, the weight ratio of insoluble fiber to soluble fiber is greater than about 3.5:1, and the weight ratio of total dietary fiber to crude protein is greater than about 0.70:1.

The nutritionally complete pet food contain additional ingredients such as vitamins, minerals, fillers, palatability enhancers, binding agents, flavors, stabilizers, emulsifiers, sweeteners, colorants, buffers, salts, coatings, and the like known to skilled artisans.

The food compositions may be prepared in a canned or wet form using conventional food preparation processes known to skilled artisans.

The present invention is also directed to a method of treating an irritable bowel syndrome, metabolic syndrome, cardiovascular disorder, or attention deficit hyperactivity disorder, in a companion animal in need thereof, comprising administering to the companion animal a pet food composition comprising an effective amount of the dietary composition.

The administration of the pet food comprising the dietary composition shifts the animal's tryptophan metabolic pathway from kyneurenine to indole related metabolites. Such a shift is beneficial to alleviate various disease conditions of the dogs. Such diseases include irritable bowel syndrome with diarrhea, metabolic syndrome, cardiovascular disorder and multifactorial neuropsychiatric Attention Deficit Hyperactivity Disorder.

DETAILED DESCRIPTION

Figures 1A, 1B:
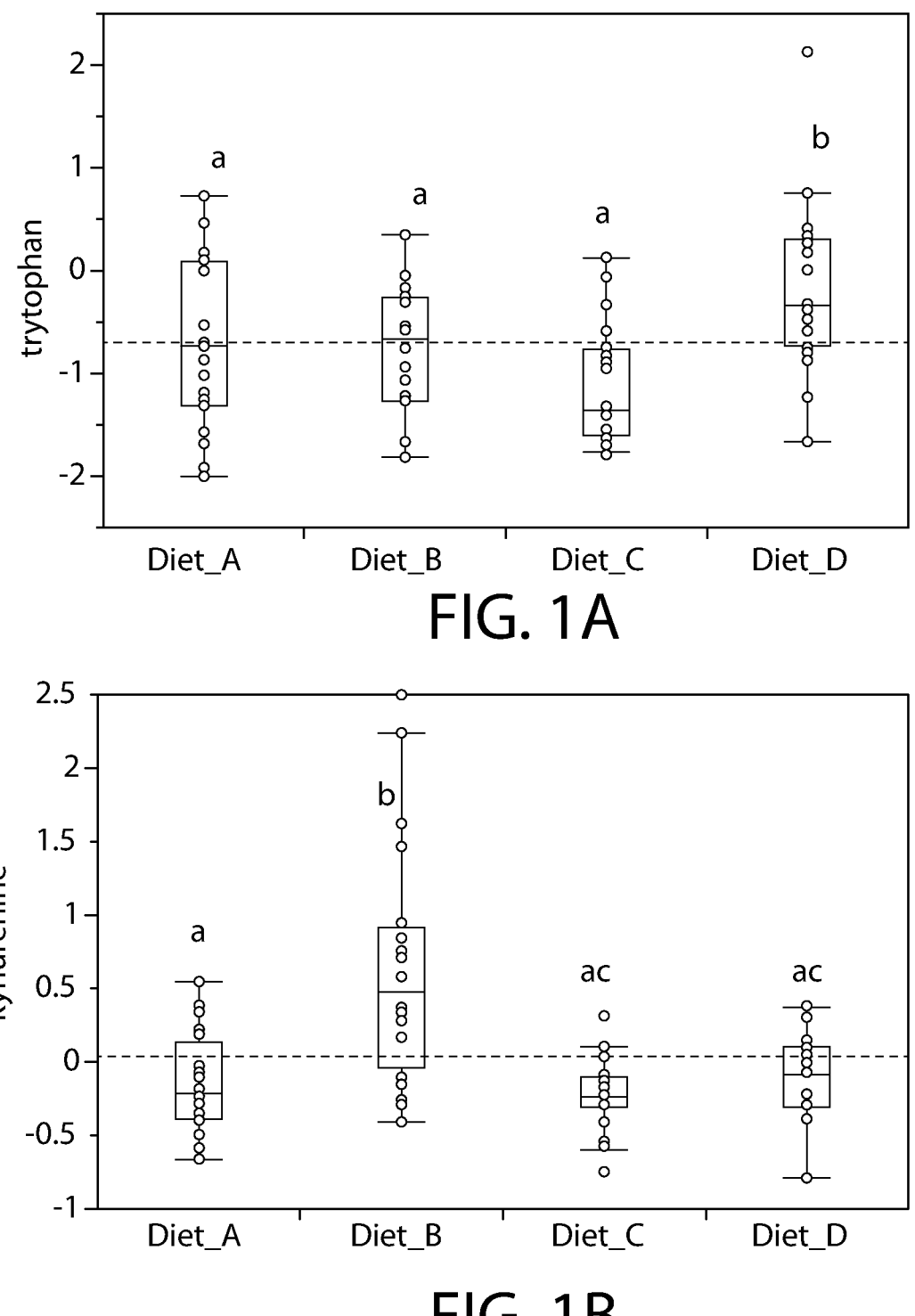
FIG. 1 presents two graphs showing the abundance of tryptophan metabolism pathway metabolites tryptophan (FIG. 1(*a*)) and kynurenine (FIG. 1(*b*)) in feces of samples collected from dogs fed with Diet A, Diet B, Diet C. and Diet D.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

As used herein and in the appended claims, the singular forms "a", "an", and "the" include plural references unless the context dictates otherwise. The singular form of any class of the ingredients refers not only to one chemical species within that class, but also to a mixture of those chemical species; for example, the term "protein" in the singular form, may refer to a mixture of compounds each of which is also considered a protein. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

The abbreviations and symbols as used herein, unless indicated otherwise, take their ordinary meaning. The abbreviations "GI" means "gastrointestinal", "IPA" means "indolepropionate", "CHO" means "carbohydrate", "IF" means "insoluble fiber" "SF" means "soluble fiber", "TDF" means "total dietary fiber", "ADHD" means "Attention Deficit Hyperactivity Disorder", "IDO1" means "indoleamine-2,3-dioxygenase 1", and "AAFCO" means the "Association of American Feed Control Officials".

The abbreviation "wt %" means percent by weight. The symbol "°" refers to a degree, including a degree of an angle and degree of Celsius.

The term "about" when referring to a number means any number within a range of 10% of the number. For example, the phrase "about 0.40:1" refers to a ratio between and including 0.3600:1 and 0.4400:1.

As used throughout, ranges are used as shorthand for describing each and every value that is within the range. Any value within the range can be selected as the terminus of the range.

The phrase "a companion animal" refers to a domesticated or domestic-bred animal whose physical, emotional, behavioral and social needs can be readily met as companions in a home, or in close daily relationship with one or more humans. Under one embodiment, species included in the definition of a companion animal include dogs, canines, cats, felines, horses, rabbits, ferrets, guinea pigs, and select other small mammals. Under another embodiment, species included in the definition of a companion animal include dogs, cats, horses, rabbits, ferrets, guinea pigs and select other small mammals, birds, small reptiles, fish, and domestic-bred farm animals.

The definition of the term "dog" includes a companion dog, a guard dog, a hunting dogs, a herding dog, and a working dog.

The definition of the term "cat" includes a domestic cat, *Felis catus*, and *Felis silvestris catus*. The definition of the term "cat" includes a house cat and a feral cat.

The phrase "adult pet" as used herein refers to a subset of "pet" and includes, for example, domesticated dogs (canines) and cats (felines) that are between about 3 years old and about 8 years old.

The phrase "senior pet" as used herein refers to a subset of "pet" and includes, for example, domesticated dogs (canines) and cats (felines) that are about 9 years old and above.

The phrase "dietary composition" refers to food for consumption by a companion animal, or to food for consumption by a dog. This phrase is to be interpreted broadly; the phrase includes food that is consumed by the companion animal or by the cat on exclusive basis, food that is consumed by the companion animal or by the dog on regular basis, food by the companion animal or by the dog consumer on occasional basis, and food by the companion animal or by the dog consumer on rare basis.

Any member in a list of species that are used to exemplify or define a genus may be mutually different from or over-lapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

All references cited herein are hereby incorporated by reference in their entireties. In the event of a conflict in a definition in the present disclosure and that of a cited reference, the present disclosure controls.

The present invention is directed to a novel diet that shifts tryptophan metabolism in in a pet. Under one embodiment, the diet shifts the tryptophan metabolism in a way that is healthier for the pet.

The present invention is directed to a dietary composition for a companion animal comprising crude protein, carbohydrate, and dietary fiber consisting of insoluble fiber and soluble fiber. Under one embodiment, the dietary composition is designed to shift the intestinal tryptophan metabolism of the companion animal from kynurenine pathway to the indole pathway to produce indole derivatives.

One advantage of the composition of the present invention is that the diet comprising the composition shifts tryptophan metabolism in a pet.

One advantage of the composition of the present invention is that the diet comprising the composition shifts tryptophan metabolism in a way that is healthier for the pet.

One advantage of the composition of the present invention is that the diet comprising the composition helps the health of a senior pet.

One advantage of the composition of the present invention is that the diet comprising the composition helps the health of an anxious pet.

One advantage of the composition of the present invention is that the diet comprising the composition helps the GI health of a pet.

One advantage of the composition of the present invention is that the diet comprising the composition helps to alleviate IBD of a pet.

It is surprising that the composition of the present invention exhibits these multiple useful effects.

One of the ingredients of the dietary composition of the present invention is crude protein. Crude protein may be supplied by any of a variety of sources known by those skilled in the art, including plant sources, animal sources, or both. Animal sources include, for example, meat, meat by-products, seafood, dairy, eggs, etc. Meats include, for example, the flesh of poultry, fish, and mammals (e.g., cattle, pigs, sheep, goats, and the like). Meat by-products include, for example, lungs, kidneys, brain, livers, and stomachs and intestines (freed of all or essentially all their contents). Plant protein includes vegetable proteins such as soybean, cotton-seed, and peanut. The protein can be intact, almost completely hydrolyzed, or partially hydrolyzed. The protein content of foods may be determined by any number of methods known by those of skill in the art, for example, as published by the Association of Official Analytical Chemists in Official Methods of Analysis ("OMA"), method 988.05. The amount of "crude protein" in a composition disclosed herein may be determined based on the amount of nitrogen in the composition according to methods familiar to one of skill in the art.

The term "protein" means a polypeptide, or a peptide, or a polymer of amino acids. The term encompasses naturally occurring and non-naturally occurring (synthetic) polymers and polymers in which artificial chemical mimetics are substituted for one or more amino acids. The term also encompasses fragments, variants, and homologs that have the same or substantially the same properties and perform the same or substantially the same function as the original sequence. The term encompasses polymers of any length, including polymers containing from about 2 to 1000, from 4 to 800, from 6 to 600, and from 8 to 400 amino acids. The term includes amino acid polymers that are synthesized and that are isolated and purified from natural sources. Under some embodiments, the terms "polypeptide", "peptide" or "protein" are used interchangeably.

One of the ingredients of the dietary composition of the present invention is carbohydrate. The term "carbohydrate" as used herein includes polysaccharides (e.g., starches and dextrins) and sugars (e.g., sucrose, lactose, maltose, glucose, and fructose) that are metabolized for energy when hydrolyzed. Examples of carbohydrates suitable for inclusion in the compositions disclosed herein include but are not limited to, corn, grain sorghum, wheat, barley, and rice.

Under one embodiment, the carbohydrate is obtained a carbohydrate source selected from the group consisting of corn, wheat, distiller's dried grain, corn starch, rice, corn gluten meal, and mixtures thereof.

Under one embodiment, the carbohydrate component comprises a mixture of one or more carbohydrate sources. Suitable carbohydrate sources include, for example, carbohydrates selected from the group consisting of oat fiber, cellulose, peanut hull, beet pulp, parboiled rice, corn starch, corn gluten meal and mixtures thereof. By properly balancing carbohydrate sources, one skilled in the art can manipulate the texture of the final product. For example, short chain polysaccharides lend to be sticky and gluey, and longer chain polysaccharides are less sticky and gluey than the shorter chain; the desired texture of this hybrid food is achieved by longer chain polysaccharide and modified starches such as native or modified starches, cellulose, and the like.

The carbohydrate mixture may additionally comprise optional components such as added salt, spices, seasonings, vitamins, minerals, flavorants, colorants, and the like. The amount of the optional additives is at least partially dependent on the nutritional requirements for different life stages of animals.

One of the ingredients of the dietary composition of the present invention is dietary fiber. Dietary fiber refers to components of a plant which are resistant to digestion by an animal's digestive enzymes. Dietary fiber, or total dietary fiber, consists of insoluble fiber and soluble fiber.

As used herein, the phrase "soluble fiber" refers to dietary fiber that attracts water during digestion and slows the rate of nutrient absorption. Soluble fiber is resistant to digestion and absorption in the small intestine and undergo complete or partial fermentation in the large intestine, and is typically found in various plant sources, including oat bran, seeds, beans, and certain fruits and vegetables such as beet pulp, guar gum, chicory root, psyllium, pectin, blueberry, cranberry, squash, apples, oats, beans, citrus, barley and peas. The phrase encompasses any source of soluble fiber suitable for the compositions disclosed herein as would be evident to one or skill in the art, Insoluble fiber may be supplied by any of a variety of sources, including cellulose, whole wheat products, wheat oat, corn bran, flax seed, grapes, celery, green beans, cauliflower, potato skins, fruit skins, vegetable skins, peanut hulls, and soy fiber.

Crude fiber includes indigestible components contained in cell walls and cell contents of plants such as grains, e.g., hulls of grains such as rice, corn, and beans. Typical fiber amounts in the composition of the invention are from about 1% to about 5%.

Under one embodiment, the weight ratio of crude protein to carbohydrate is less than about 0.40:1. Under one embodiment, the weight ratio of crude protein to carbohydrate is less than about 0.35:1. Under one embodiment, the weight ratio of crude protein to carbohydrate is less than about 0.30:1. Under one embodiment, the weight ratio of crude protein to carbohydrate is less than about 0.25:1.

Under one embodiment, the weight ratio of crude protein to carbohydrate is between about 0.10:1 to about 0.40:1. Under one embodiment, the weight ratio of crude protein to carbohydrate is between about 0.15:1 to about 0.40:1. Under one embodiment, the weight ratio of crude protein to carbohydrate is between about 0.20:1. to about 0.40:1. Under one embodiment, the weight ratio of crude protein to carbohydrate is between about 0.25:1 to about 0.40.1. Under one embodiment, the weight ratio of crude protein to carbohydrate is between about 0.30:1 to about 0.40:1. Under one embodiment, the weight ratio of crude protein to carbohydrate is between about 0.35:1 to about 0.40:1.

Under one embodiment, the weight ratio of crude protein to carbohydrate is between about 0.10:1 to about 0.35:1. Under one embodiment, the weight ratio of crude protein to carbohydrate is between about 0.15:1 to about 0.35:1. Under one embodiment, the weight ratio of crude protein to carbohydrate is between about 0.20:1 to about 0.35:1 Under one embodiment, the weight ratio of crude protein to carbohydrate is between about 0.25:1 to about 0.35:1. Under one embodiment, the weight ratio of crude protein to carbohydrate is between about 0.30:1 to about 0.35:1.

Under one embodiment, the weight ratio of crude protein to carbohydrate is between about 0.10:1 to about 0.30:1. Under one embodiment, the weight ratio of crude protein to carbohydrate is between about 0.15:1 to about 0.30:1. Under one embodiment, the weight ratio of crude protein to carbohydrate is between about 0.20:1 to about 0.30:1. Under one embodiment, the weight ratio of crude protein to carbohydrate is between about 0.25:1 to about 0.30:1

Under one embodiment, the weight ratio of crude protein to carbohydrate is between about 0.10:1 to about 0.25:1. Under one embodiment, the weight ratio of crude protein to carbohydrate is between about 0.15:1 to about 0.25:1. Under one embodiment, the weight ratio of crude protein to carbohydrate is between about 0.20:1 to about 0.25:1. Under one embodiment, the weight ratio of crude protein to carbohydrate is between about 0.10:1 to about 0.20:1. Under one embodiment, the weight ratio of crude protein to carbohydrate is between about 0.15:1 to about 0.20:1. Under one embodiment, the weight ratio of crude protein to carbohydrate is between about 0.10:1 to about 0.15:1.

Under one embodiment, the weight ratio of insoluble fiber to soluble fiber is greater than about 3.5:1. Under one embodiment, the weight ratio of insoluble fiber to soluble fiber is greater than about 4.0:1. Under one embodiment, the weight ratio of insoluble fiber to soluble fiber is greater than about 4.5:1. Under one embodiment, the weight ratio of insoluble fiber to soluble fiber is greater than about 5.0:1. Under one embodiment, the weight ratio of insoluble fiber to soluble fiber is greater than about 6.0:1. Under one embodiment, the weight ratio of insoluble fiber to soluble fiber is greater than about 10.0:1.

Under one embodiment, the weight ratio of insoluble fiber to soluble fiber is between about 3.5:1 and about 10.0:1. Under one embodiment, the weight ratio of insoluble fiber to soluble fiber is between about 4.0:1 and about 10.0:1. Under one embodiment, the weight ratio of insoluble fiber to soluble fiber is between about 4.5:1 and about 10.0:1. Under one embodiment, the weight ratio of insoluble fiber to soluble fiber is between about 5.0:1 and about 10.0:1. Under one embodiment, the weight ratio of insoluble fiber to soluble fiber is between about 6.0:1 and about 10.0:1.

Under one embodiment, the weight ratio of insoluble fiber to soluble fiber is between about 3.5:1 and about 6.0:1. Under one embodiment, the weight ratio of insoluble fiber to soluble fiber is between about 4.0:1 and about 6.0:1. Under one embodiment, the weight ratio of insoluble fiber to soluble fiber is between about 4.5:1 and about 6.0:1. Under one embodiment, the weight ratio of insoluble fiber to soluble fiber is between about 5.0:1 and about 6.0:1.

Under one embodiment, the weight ratio of insoluble fiber to soluble fiber is between about 3.5:1 and about 5.0:1. Under one embodiment, the weight ratio of insoluble fiber to soluble fiber is between about 4.0:1 and about 5.0:1. Under one embodiment, the weight ratio of insoluble fiber to soluble fiber is between about 4.5:1 and about 5.0:1. Under one embodiment, the weight ratio of insoluble fiber to soluble fiber is between about 3.5:1 and about 4.5:1. Under one embodiment, the weight ratio of insoluble fiber to soluble fiber is between about 4.0:1 and about 4.5:1. Under one embodiment, the weight ratio of insoluble fiber to soluble fiber is between about 3.5:1 and about 4.0:1.

Under one embodiment, the weight ratio of total dietary fiber to crude protein is greater than about 0.70:1. Under one embodiment, the weight ratio of total dietary fiber to crude protein is greater than about 0.80:1. Under one embodiment, the weight ratio of total dietary fiber to crude protein is greater than about 0.90:1. Under one embodiment, the weight ratio of total dietary fiber to crude protein is greater than about 1.0:1. Under one embodiment, the weight ratio of total dietary fiber to crude protein is greater than about 2.0:1. Under one embodiment, the weight ratio of total dietary fiber to crude protein is greater than about 4.0:1.

Under one embodiment, the weight ratio of total dietary fiber to crude protein is between about 0.70:1 and about 4.0:1. Under one embodiment, the weight ratio of total dietary fiber to crude protein is between about 0.80:1 and about 4.0:1. Under one embodiment, the weight ratio of total dietary fiber to crude protein is between about 0.90:1 and about 4.0:1. Under one embodiment, the weight ratio of total dietary fiber to crude protein is between about 1.0:1 and about 4.0:1. Under one embodiment, the weight ratio of total dietary fiber to crude protein is between about 2.0:1 and about 4.0:1.

Under one embodiment, the weight ratio of total dietary fiber to crude protein is between about 0.70:1 and about 2.0:1. Under one embodiment, the weight ratio of total dietary fiber to crude protein is between about 0.80:1 and about 2.0:1. Under one embodiment, the weight ratio of total dietary fiber to crude protein is between about 0.90:1 and about 2.0:1. Under one embodiment, the weight ratio of total dietary fiber to crude protein is between about 1.0:1 and about 2.0:1.

Under one embodiment, the weight ratio of total dietary fiber to crude protein is between about 0.70:1 and about 1.0:1. Under one embodiment, the weight ratio of total dietary fiber to crude protein is between about 0.80:1 and about 1.0:1. Under one embodiment, the weight ratio of total dietary fiber to crude protein is between about 0.90:1 and about 1.0:1.

Under one embodiment, the weight ratio of total dietary fiber to crude protein is between about 0.70:1 and about 0.90:1. Under one embodiment, the weight ratio of total dietary fiber to crude protein is between about 0.80:1 and about 0.90:1. Under one embodiment, the weight ratio of total dietary fiber to crude protein is between about 0.70:1 and about 0.80:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is less than about 0.40:1, the weight ratio of insoluble fiber to soluble fiber is greater than about 3.5:1, and the weight ratio of total dietary fiber to crude protein is greater than about 0.70:1.

Under one embodiment, the present invention is directed to a dietary composition for a companion animal comprising crude protein, carbohydrate, and dietary fiber consisting of insoluble fiber and soluble fiber; herein the weight ratio of crude protein to carbohydrate is between about 0.40:1 and about 0.25:1, the weight ratio of insoluble fiber to soluble fiber is between about 3.5:1 and about 5.0:1, and the weight ratio of total dietary fiber to crude protein is between about 0.70.1. and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 3.5:1 and about 5.0:1, and the weight ratio of total dietary fiber to crude protein is between about 0.80:1 and about 2.0:1.

Under one embodiment, the present invention is directed to a dietary composition for a companion animal comprising crude protein, carbohydrate and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 3.5:1 and about 5.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 4.0:1 and about 6.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio a insoluble fiber to soluble fiber is between about 4.0:1 and about 6.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting a insoluble fiber and soluble fiber; wherein the weight ratio of crude protein to carbohydrate is between about 0.40:1 and about 0.25:1, the weight ratio of insoluble fiber to soluble fiber is between about 4.0:1 and about 6.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 5.0:1 and about 10.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 5.0:1 and about 10.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.40:1 and about 0.25:1, the weight ratio of insoluble fiber to soluble fiber is between about 5.0:1 and about 10.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 3.5:1 and about 5.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 3.5:1 and about 5.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 3.5:1 and about 5.0:1, and the weight ratio of total dietary fiber to crude protein is between about 1.0:1 and about 4.01.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 4.0:1 and about 6.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 4.0:1 and about 6.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio a insoluble fiber to soluble fiber is between about 4.0:1 and about 6.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting is insoluble fiber and soluble fiber; wherein the weight ratio of crude protein to carbohydrate is between about 0.30:1 and about 0.20:1, the weight ratio of insoluble fiber to soluble fiber is between about 5.0:1 and about 10.0:1, and the weight ratio of total dietary fiber to crude protein is between about 0.70:1 and about 1.0:1.

Under one embodiment, the present inventions directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 5.0:1 and about 10.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.30:1 and about 0.20:1, the weight ratio of insoluble fiber to soluble fiber is between about 5.0:1 and about 10.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 3.5:1 and about 5.0:1, and the weight ratio of total dietary fiber to crude protein is between about. 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 3.5:1 and about 5.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 3.5:1 and about 5.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 4.0:1 and about 6.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 4.0:1 and about 6.0:1, and the weight ratio of total dietary fiber to crude protein is between about 0.80:1 and about 2.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 4.0:1 and about 6.0:1, and the weight ratio of total dietary fiber to crude protein is between about 1.0:1 and about 4.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 5.0:1 and about 10.0:1, and the weight ratio of total dietary fiber to crude protein is between about 0.70:1 and about 1.0:1.

Under one embodiment, the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 5.0:1 and about 10.0:1, and the weight ratio of total dietary fiber to crude protein is between about 0.80:1 and about 2.0:1.

Under one embodiment the present invention is directed to a dietary composition for a companion animal comprising crude protein, carbohydrate, and dietary fiber consisting of insoluble fiber and soluble fiber; wherein the weight ratio of crude protein to carbohydrate is between about 0.20:1 and about 0.10:1, the weight ratio of insoluble fiber to soluble fiber is between about 5.0:1 and about 10.0:1, and the weight ratio of total dietary fiber to crude protein is between about 1.0:1 and about 4.0:1.

The present invention is also directed to a dietary composition for a companion animal comprising crude protein, carbohydrate, dietary fiber consisting of insoluble fiber and soluble fiber, and an additional ingredient. The additional ingredient is selected from the group consisting of crude fat, crude fiber, ash, and moisture. Under one embodiment, more than one of these ingredients is present in the dietary composition.

Under one embodiment, the dietary composition for a companion animal comprises crude protein, carbohydrate, dietary fiber consisting of insoluble fiber and soluble fiber, crude fat, crude fiber, ash, and moisture.

Crude fat or fat can be supplied by any of a variety of sources known by those skilled in the art, including meat, meat by-products, fish oil, and plants, Plant fat sources include wheat, flaxseed, rye, barley, rice, sorghum, corn, oats, millet, wheat germ, corn germ, soybeans, peanuts, and cottonseed, as well as oils derived from these and other plant fat sources. The fat content of a composition may be determined by any number of methods known by those of skill in the art.

"Ash" consists of compounds that are not organic or water, generally produced by combustion of biological materials. Ash may be determined by any number of methods known by those of skill in the art.

Moisture is the amount of water in the dietary composition. Dry kibble tends to have a moisture content of between 6 and 10 percent, semi-moist foods between 15 and 30 percent, and wet foods around 75 percent.

The neutral detergent fiber for the composition is between about 5 wt % and about 10 wt %. Neutral detergent fiber represents the residue or insoluble fraction left after boiling a feed sample in neutral detergent solution.

The present invention is also directed to a nutritionally complete pet food comprising a dietary composition for a companion animal comprising crude protein, carbohydrate, and dietary fiber consisting of insoluble fiber and soluble fiber, wherein the composition shifts the intestinal tryptophan metabolism of the animal from kynurenine pathway to indole pathway to produce indole derivatives.

The present invention is also directed to a nutritionally complete pet food comprising a dietary composition for a companion animal comprising crude protein, carbohydrate, and dietary fiber consisting of insoluble fiber and soluble fiber, wherein the weight ratio of crude protein to carbohydrate is less than about 0.40:1, the weight ratio of insoluble fiber to soluble fiber is greater than about 3.5:1, and the weight ratio of total dietary fiber to crude protein is greater than about 0.70:1.

The nutritionally complete pet food contain additional ingredients such as vitamins, minerals, fillers, palatability enhancers, binding agents, flavors, stabilizers, emulsifiers, sweeteners, colorants buffers, salts, coatings, and the like known to skilled artisans. Stabilizers include substances that tend to increase the shelf life of the composition such as preservatives, synergists and sequestrants, packaging gases, stabilizers, emulsifiers, thickeners, gelling agents, and humectants. Examples of emulsifiers and/or thickening agents include gelatin, cellulose ethers, starch, starch esters, starch ethers, and modified starches. Specific amounts for each composition component, food ingredient, and other ingredients will depend on a variety of factors such as the particular components and ingredients included in the composition; the species of patient; the patient's age, body weight, general health, sex, and diet; the animal's consumption rate; the type of disease being treated; and the like. Therefore, the component and ingredient amounts may vary widely and may deviate from the preferred proportions described herein.

The food compositions may be prepared in a canned or wet form using conventional food preparation processes known to skilled artisans. Typically, ground animal proteinaceous tissues are mixed with the other ingredients such as fish oils, cereal grains, balancing ingredients, special purpose additives (e.g., vitamin and mineral mixtures, inorganic salts, cellulose and beet pulp, bulking agents, and the like) and water in amounts sufficient for processing. These ingredients are mixed in a vessel suitable for heating while blending the components. Heating of the mixture is effected using any suitable manner, e.g., direct steam injection or using a vessel fitted with a heat exchanger. Following the addition of the last ingredient, the mixture is heated to a temperature of from about 10° C. to about 100° C. Temperatures outside this range are acceptable but may be commercially impractical without use of other processing aids. When heated to the appropriate temperature, the material will typically be in the form of a thick liquid. The thick liquid is filled into cans. A lid is applied, and the container is hermetically sealed. The sealed can is then placed into conventional equipment designed to sterilize the contents. Sterilization is usually accomplished by heating to temperatures of greater than about 110° C. for an appropriate time depending on the temperature used, the composition, and similar factors. The compositions of the present invention can be added to the food compositions before, during, or after preparation.

The food compositions may be prepared in a dry form using conventional processes known to skilled artisans. Typically, dry ingredients such as animal protein, plant protein, grains, and the like are ground and mixed together. Moist or liquid ingredients, including fats, oils, animal protein, water, and the like are then added to and mixed with the dry mix. The mixture is then processed into dry food pieces.

The food compositions can be in any form useful for feeding the composition to a patient, e.g., kibbles, treats, and toys for animal food. Kibbles are generally formed using an extrusion process in which the mixture of dry and wet ingredients is subjected to mechanical work at a high pressure and temperature and forced through small openings and cut off into kibble by a rotating knife. The wet kibble is then dried and optionally coated with one or more topical coatings such as flavors, fats, oils, powders, and the like. Kibble also can be made from the dough using a baking process, rather than extrusion, wherein the dough is placed into a mold before dry-heat processing. Treats include compositions that are given to an animal to entice the animal to eat during a non-meal time, e.g., dog bones or biscuits for canines. Treats may be nutritional wherein the composition comprises one or more nutrients or and may have a food-like composition. Non-nutritional treats encompass any other treats that are non-toxic. The composition or components are coated onto the treat, incorporated into the treat, or both. Treats of the present invention can be prepared by an extrusion or baking process similar to those used for dry food. Other processes also may be used to either coat the composition on the exterior of existing treat forms or inject the composition into an existing treat form. Toys include chewable toys such as artificial bones and food compositions shaped to resemble natural foods that are appealing to the animal. The food composition of the present invention can comprise the toy or can form a coating on the surface of the toy or on the surface of a component of the toy. The composition can be incorporated partially or fully throughout the toy or both. In one embodiment, the composition is orally accessible by the intended user. The present invention encompasses partially consumable toys, e.g., toys comprising plastic components, and fully consumable toys, e.g., various artificial bones and similar foods. Further, the invention encompasses toys for both human and non-human use, particularly toys for companion, farm, and zoo animal use, and more particularly for feline and canine use.

The present invention is also directed to a method of treating an irritable bowel syndrome, metabolic syndrome, cardiovascular disorder, or attention deficit hyperactivity disorder, in a companion animal in need thereof, comprising administering to the companion animal a pet food composition comprising an effective amount of the dietary composition.

The administration of the pet food comprising the dietary composition shifts the animal's tryptophan metabolic pathway from kynurenine to indole related metabolites. Such a shift is beneficial to alleviate various disease conditions of the dogs. Such diseases include irritable bowel syndrome with diarrhea, metabolic syndrome, cardiovascular disorder and multifactorial neuropsychiatric Attention Deficit Hyperactivity Disorder.

Intestinal tryptophan metabolism follows three pathways: (a) direct transformation into indole and indole derivative molecules which includes ligands of aryl hydrocarbon receptor by the gut microbiota, (b) the kynurenine pathway in both immune and epithelial cells by host indoleamine 2,3-dioxygenase (IDO)1 and (c) the serotonin production pathway in enterochromaffin cells of the host via tryptophan hydroxylase 1 (TpH1). Several diseases are associated with the role of gut microbiota such as inflammatory bowel disease (IBD), metabolic syndrome and associated diseases such as obesity, diabetes and nonalcoholic fatty liver diseases and neuropsychiatric disorders, particularly anxiety depression and autism. Many of these diseases are also influenced by tryptophan metabolism end products.

The phrase "inflammatory bowel disease" or the term "IBD" refer to an inflammatory condition of the large and sometimes small intestines. The phrase and term also refer to a group of idiopathic gastrointestinal disorders characterized by continuous or recurring abdominal pain or cramping. The pain may range from mild to severe. Pain is frequently associated with altered bowel motility (e.g., diarrhea, constipation, or both).

IBD is also characterized by inflammatory infiltrates within the lamina propria of the gastrointestinal tract. IBD encompasses segmental granulomatous enterocolitis, lymphoplasmacytic enteritis, eosinophilic gastroenterocolitis, lymphocytic gastroenterocolitis, suppurative enterocolitis and histiocytic colitis. These specific types of IBD are characterized based on the type of inflammatory infiltrate found in the lamina propria. The inflammatory infiltrates can be quite variable in terms of severity and cell types, with lymphocytes and plasma cells being the most common cell types. Inflammatory infiltrates may involve the stomach, small bowel and colon. In the cat, for example, the stomach and small bowel are affected most often. In many cases, multiple segments of the bowel are involved and clinical signs may be mixed, reflecting the broad distribution of mucosal lesions. The severity of IBD varies from mild clinical signs to life-threatening protein-losing enteropathies.

IBD may be marked by any of the following symptoms: abdominal pain, vomiting, diarrhea, hematochezia (bright red blood in stools), weight loss, and various associated complaints or diseases like arthritis, pyoderma gangrenosum, and primary sclerosing cholangitis. IBD may also be a result of the following conditions: Crohn's disease, ulcerative colitis, overactive immune system, collagenous colitis, lymphocytic colitis, ischemic colitis diversion colitis, Bechet's syndrome, infective colitis, and indeterminate colitis.

Mucosal inflammatory infiltrates are responsible for the clinical manifestations of IBD. Mucosal inflammation disrupts normal absorptive processes. Such disruption results in malabsorption and osmotic diarrhea. Altered gut permeability can result in leakage of fluid, protein and blood into the gut lumen. Malabsorbed fats, carbohydrates, and bile acids result in secretory diarrhea. Inflammatory mediators may also directly trigger intestinal secretion and mucus production by goblet cells. Mucosal inflammatory infiltrates may alter intestinal and colonic motility patterns, a mechanism attributed to the influence of prostaglandins and leukotrienes on smooth muscle. Inflammation of the stomach and small bowel stimulates receptors that trigger vomiting. In cats, for example, the most common clinical signs of IBD are chronic vomiting, diarrhea and weight loss.

Cardiovascular disorder includes any of cardiovascular diseases that affect more than about 10% of the animals examined by a veterinarian. Unlike diseases of many other organ systems, cardiovascular diseases generally do not go away but almost always become more serious and may lead to death. In addition, cardiovascular diseases may be more difficult to detect and quantify because the heart cannot be seen and is protected so well by the rib cage.

Under one embodiment, cardiovascular disorder includes a heart disease. A heart disease is defined, under one embodiment, as any abnormality of the heart. It encompasses a wide range of conditions, including congenital abnormalities and disorders of physical structure, function, or electrical activity. It can be classified by various methods, including whether the disease was present at birth or not (that is, congenital or acquired). causes (for example, infectious or degenerative), duration (for example, long- or short-term), clinical status (for example left heart failure, right heart failure, or biventricular failure), by physical structure malformation (for example, ventricular septal defect), or by electrical disturbance (for example, atrial fibrillation).

Under one embodiment, cardiovascular disorder includes a heart failure. Heart failure is any heart abnormality that results in failure of the heart to pump enough blood to meet the body's needs. It is not a specific disease; rather, it is a condition in which congestion or an abnormal accumulation of fluid, decreased blood flow to the body, and/or abnormally low blood pressure arise as the final consequence of severe heart disease. Heart disease can be present without ever leading to heart failure. Heart failure, however, can only occur if heart disease is present because it is a consequence of severe heart disease.

Under one embodiment, cardiovascular disorder includes abnormalities of the cardiovascular system that can lead to heart disease. Examples of abnormalities include the heart valves fail to close or open properly (valvular disease); the heart muscle pumps too weakly or relaxes inadequately (myocardial disease); the heart beats too slowly, too rapidly, or irregularly (arrhythmia); the blood vessels offer too great an interference to blood flow (vascular disease); there may be openings between chambers of the left side and right side of the heart (cardiac shunts) or abnormal blood flow between the body and the lungs (extracardiac shunts); there is too little or too much blood compared with the ability of the blood vessels to store that blood; and there is parasitism of the cardiovascular system, such as heartworm disease.

Signs associated with any of these diseases are due either to inadequate blood flow through the organs (signs include exercise intolerance, weakness, and fainting) or to blood damming up in organs, which causes fluid to leak from blood vessels into tissues (signs include abnormal accumulation of fluid in the lungs or abdomen). A dog showing signs of having too little blood in the tissues to sustain normal function is said to be in low output heart failure. A dog showing signs caused by blood damming up in poorly drained organs is said to be in congestive heart failure. When there is not enough oxygen in the blood, the mucous membranes develop a blue tinge, and often there is an increased concentration of red blood cells.

The diseases of greatest importance in dogs, due to the number of cases that exist, are mitral regurgitation due to mitral valve dysplasia, dilated cardiomyopathy, arrhythmic cardiomyopathy in Boxers, and heartworm disease.

EXAMPLES

Two diets (Diet A and Diet B were formulated according to the AAFCO nutrition recommendation. The kibble was generated by extrusion, dried and coated with palatants. Diet A and Diet B differed from each other in their protein and carbohydrate levels. The rest of the nutrients levels were the same or similar in both diets.

Comparative diets were commercially available. Comparative Diet C is the Grain Free Blue Wilderness diet from Blue Buffalo (Wilton, Connecticut, USA). Diet C is a high protein diet. Comparative Diet D is Science diet Canine adult, available from Hill's Pet Nutrition, Inc. (Topeka, Kansas, USA). The compositions of the four diets, as well as ratios of crude protein to carbohydrates, crude protein to total dietary fiber, and insoluble fiber to soluble fiber, are presented in Table 1 below.

TABLE 1

| Analyte | Diet A | Diet B | Diet C | Diet D |
|---|---|---|---|---|
| Crude fat | 19.47 | 20.88 | 18.37 | 13.69 |
| Crude fiber | 3.80 | 2.00 | 2.90 | 1.9 |
| Insoluble fiber | 8.7 | 5.4 | 7.4 | 6.7 |
| Neutral detergent fiber | 7.0 | 5.2 | 10.7 | 7.5 |
| Soluble fiber | 2.3 | 3.2 | 1.7 | 2.0 |
| Total dietary fiber | 11.0 | 8.6 | 9.1 | 8.7 |
| Crude protein | 14.92 | 31.46 | 33.10 | 22.80 |
| Carbohydrates | 49.46 | 30.17 | 30.31 | 47.71 |
| Ash | 4.19 | 6.50 | 8.12 | 5.09 |
| Moisture | 8.16 | 8.99 | 7.20 | 8.81 |
| Protein: Carbohydrates | 0.301 | 1.042 | 1.082 | 0.477 |
| Insoluble fiber: Soluble Fiber | 3.782 | 1.687 | 4.352 | 3.35 |
| Total Dietary Fiber: Crude protein | 0.737 | 0.273 | 0.274 | 0.381 |

The amino acid profile of the four diets are shown below in Table 2.

TABLE 2

| Analyte | Diet A | Diet B | Diet C | Diet D |
|---|---|---|---|---|
| Alanine | 1.00 | 2.13 | 1.94 | 1.49 |
| Arginine | 0.60 | 1.64 | 2.26 | 1.13 |
| Cystine | 0.25 | 0.47 | 0.44 | 0.31 |
| Glycine | 0.53 | 1.72 | 2.91 | 1.43 |
| Histidine | 0.32 | 0.74 | 0.72 | 0.50 |
| Isoleucine | 0.54 | 1.30 | 1.28 | 0.84 |
| Leucine | 1.80 | 3.25 | 2.24 | 2.27 |
| Lysine | 0.97 | 2.20 | 2.15 | 0.91 |
| Methionine | 0.38 | 0.87 | 0.69 | 0.46 |
| Phenylalanine | 0.76 | 1.55 | 1.38 | 1.07 |
| Proline | 1.07 | 2.00 | 2.01 | 1.77 |
| Serine | 0.70 | 1.48 | 1.48 | 0.99 |
| Threonine | 0.62 | 1.35 | 1.25 | 0.81 |
| Tryptophan | 0.15 | 0.36 | 0.31 | 0.22 |
| Tyrosine | 0.52 | 1.09 | 0.75 | 0.76 |
| Valine | 0.67 | 1.53 | 1.61 | 1.01 |

The study was performed on a total of 80 healthy dogs with age ranges from about 4.0 years to about 13.7 years. Body weights ranged from about 7.1 to about 28.6 kg. All animals were either neutered or spayed. This study design comprised the use of four diets which included two working exemplary diets (Diets A and B) and two comparative exemplary diets (Diets C and D) The feeding study was performed by the following parallel experiment design. All 80 dogs were prefed with Diet D (control diet) for 14 days. The 80 dogs Were divided into four groups of 20 dogs each by matching age and gender parameters. Each group was fed one of the four diets for 14 days without a washout period.

The group that continued to be fed with Diet D was observed to measure the effect of the diet over the treatment period as well as to check the feeding time effect. Fecal samples were collected at the end of pre-feeding period (14th day) and at the end of treatment period (28th day).

Fecal samples were collected within 30 minutes after defecation and transferred into a labeled collection bag for homogenization. The samples were thoroughly homogenized by hand to remove clumps and squeezed to the corner of the bag. The bag was snipped at the edge, the fecal sample was squeezed into a respective labeled cryovial tube and snap frozen with liquid nitrogen. The snap frozen cryovial tubes were transferred into a container kept at $-70°$ C. until further processing for various assays.

A non-targeted metabolomics analysis was performed on the frozen fecal samples collected from each dog fed by both the control Diet D as well as the subsequent experimental diets. Samples were collected at the end of pre-feed (control diet) period (14th day) and at the end of treatment period (28th day).

Frozen fecal samples were lyophilized into powder and partitioned with methanol. The resulting extract was divided into five aliquots to analyze on four different platforms established by Metabolon Inc., to obtain the levels of tryptophan, kynurenine, indolelactate, indoleacetate indolepropionate, indole, and 3-indoxyl sulfate. The remaining one aliquot was stored as reserve sample. Data was represented as relative fold quantification and statistical analysis was performed by using statistical analysis software JMP Pro 13 (SAS, Cary, North Carolina, USA).

FIG. 1 presents two graphs showing the abundance of tryptophan metabolism pathway metabolites tryptophan (FIG. 1(a)) and kynurenine (FIG. 1(b)) in feces of samples collected from dogs fed with Diet A, Diet B, Diet C, and Diet D. Different letters on the bars indicate significant differences between the treatments under Wilcoxon test ($p \leq 0.05$). The vertical y-axis represents the differences of the metabolite abundance (as scaled intensity value) of the individual subjects between the treatment and pre-feed phase.

Figure 2A:
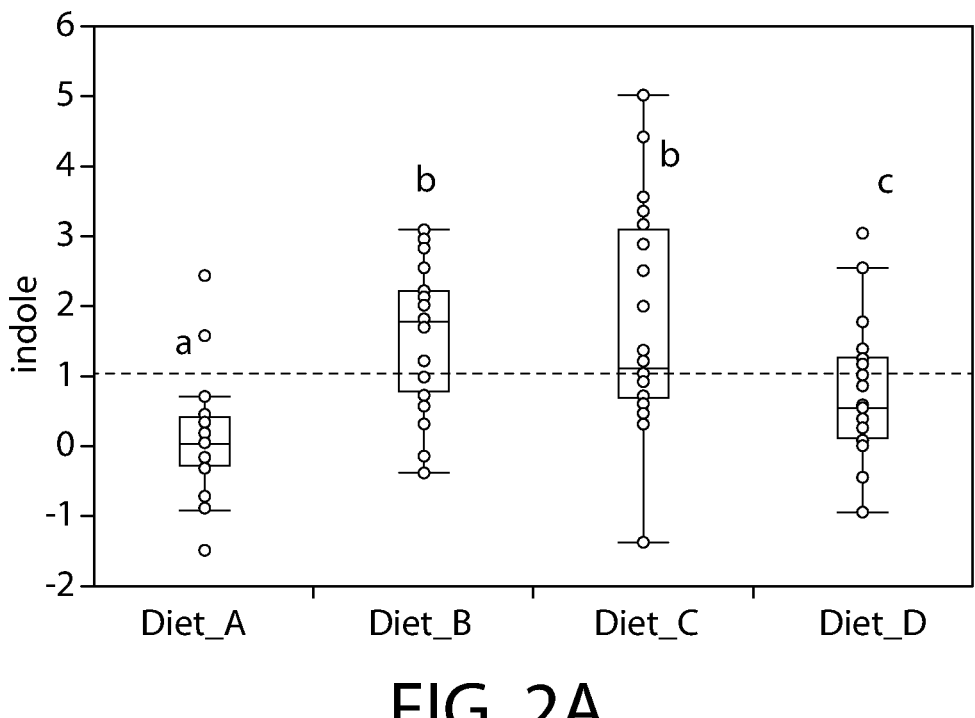
FIG. 2 presents two graphs showing the abundance a tryptophan metabolism pathway metabolite indole (FIG. 2(*a*)) in feces of samples collected from dogs fed with Diet A, Diet B, Diet C, and Diet D and the ratio of kynurenine to tryptophan (FIG. 2(*b*)).
Figure 2B:
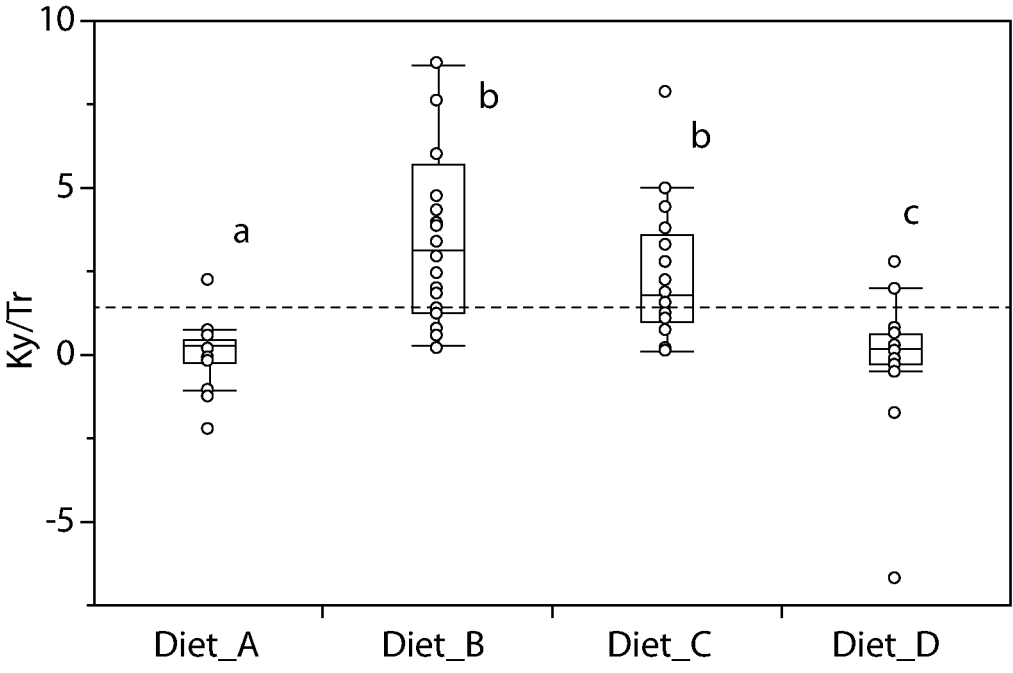

FIG. 2 presents two graphs showing the abundance of tryptophan metabolism pathway metabolite indole (FIG. 2(a)) in feces of samples collected from dogs fed with Diet A, Diet B, Diet C, and Diet D and the ratio of kynurenine to tryptophan (FIG. 2(b)). Different letters on the bars indicate significant differences between the treatments under Wilcoxon test ($p \leq 0.05$). For FIG. 2(a) the vertical y-axis represents the differences of the metabolite abundance (as scaled intensity value) of the individual subjects between the treatment and pre-feed phase. For FIG. 2(b), the vertical y-axis represents the kynurenine to tryptophan ratio.

Figures 3A, 3B:
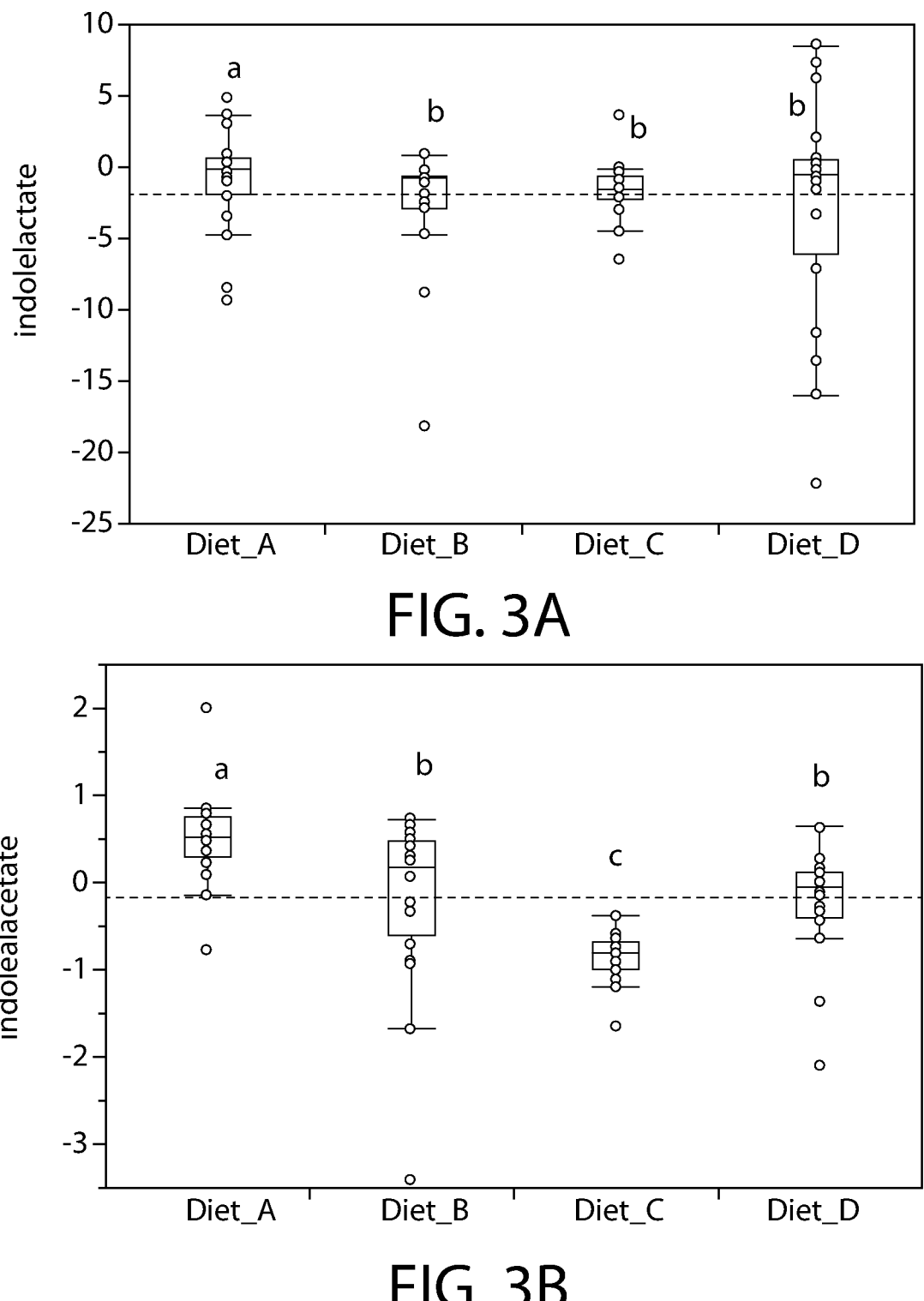
FIG. 3 presents two graphs showing the abundance of indole derivative metabolites indolelactate (FIG. 3(*a*)) and indoleacetate (FIG. 3(*b*)) in feces of samples collected from dogs fed with Diet A, Diet B, Diet C, and Diet D. D

FIG. 3 presents two graphs showing the abundance of indole derivative metabolites indolelactate (FIG. 3(a)) and indoleacetate (FIG. 3(b)) in feces of samples collected from dogs fed with Diet A, Diet B, Diet C, and Diet D. Different letters on the bars indicate significant differences between the treatments under Wilcoxon test ($p \leq 0.05$). The vertical y-axis represents the differences of the metabolite abundance (as scaled intensity value) of the individual subjects between the treatment and pre-feed phase.

Figures 4A, 4B:
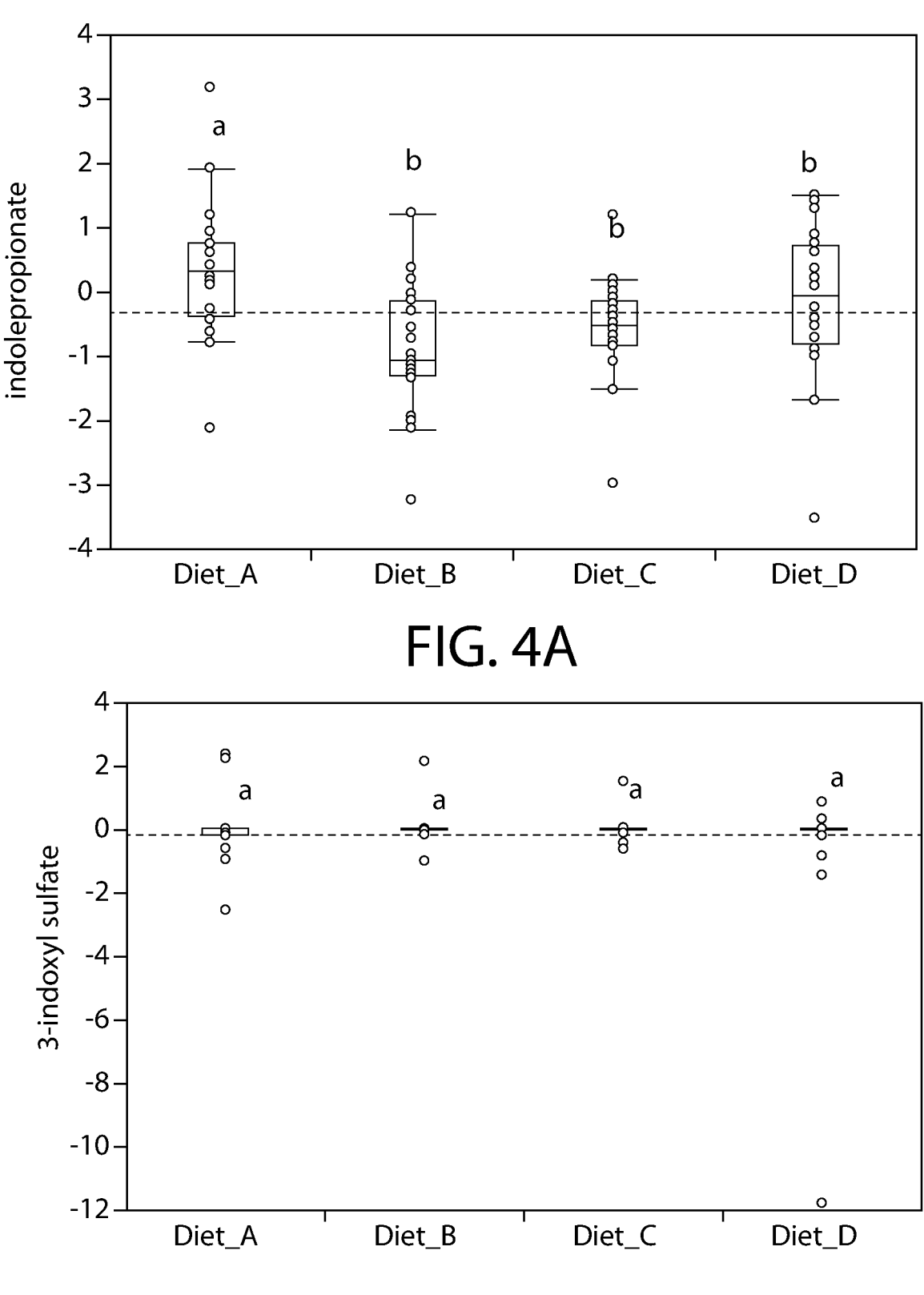
FIG. 4 presents two graphs showing the abundance of indole derivative metabolites indolepropionate (FIGS. 4(*a*)) and 3-indoxyl sulfate (FIG. 4(*b*)) in feces of samples collected from dogs fed with Diet A, Diet B, Diet C, and Diet D.

FIG. 4 presents two graphs showing the abundance of indole derivative metabolites indolepropionate (FIG. 4(a))

and 3-indoxyl sulfate (FIG. 4(b)) in feces of samples collected from dogs fed with Diet A, Diet B, Diet C, and Diet D. Different letters on the bars indicate significant differences between the treatments under Wilcoxon test ($p \leq 0.05$). The vertical y-axis represents the differences of the metabolite abundance (as scaled intensity value) of the individual subjects between the treatment and pre-feed phase.

Figure 5A:
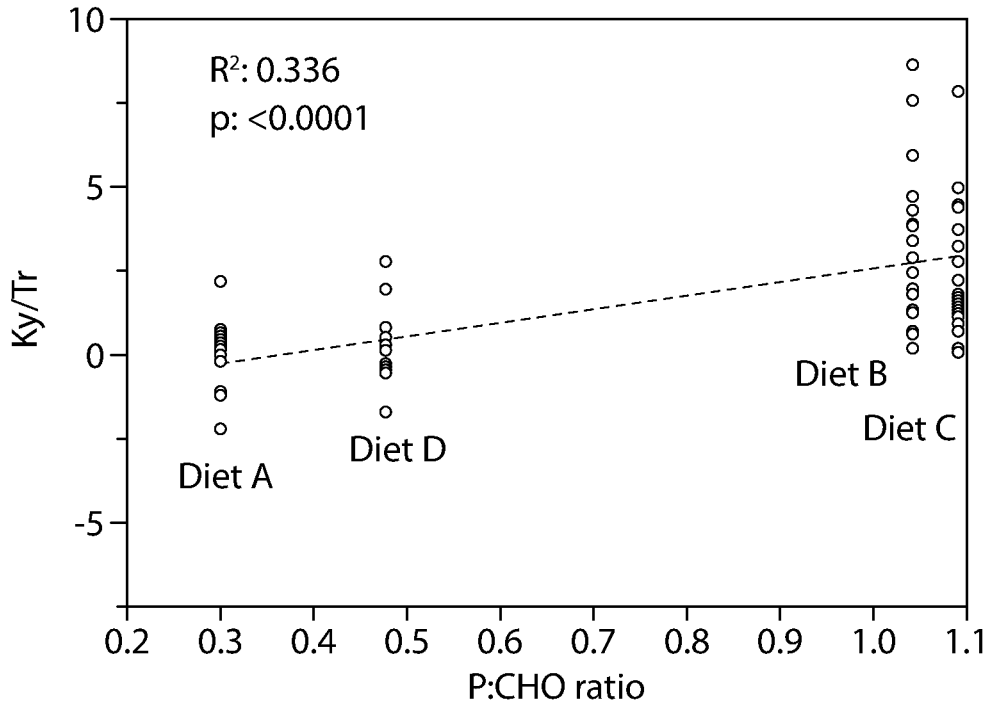
FIG. 5 presents correlation coefficients of dietary macronutrient ratios and fecal metabolites involved in tryptophan metabolism for Diets A to D.
Figure 5B:
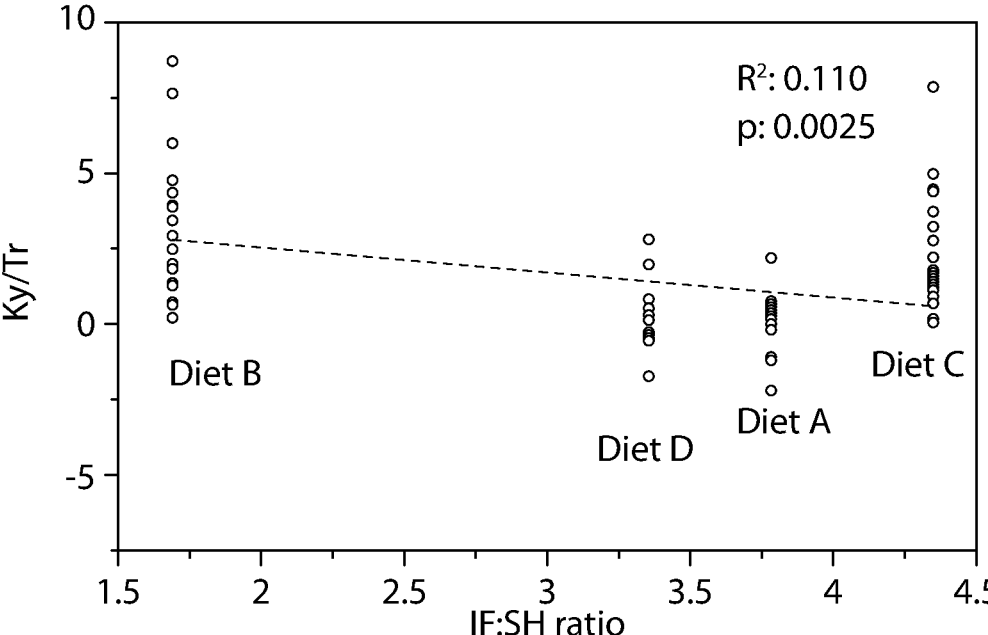

FIG. 5 presents correlation coefficients of dietary macronutrient ratios and fecal metabolites involved in tryptophan metabolism for Diets A to D. FIG. 5(a) shows the ratio of kynurenine to tryptophan ratio vs the crude protein to carbohydrate ratio present in the four diets. FIG. 5(b) shows the ratio of kynurenine to tryptophan ratio vs the crude protein to carbohydrate ratio present in the four diets.

Figure 6A:
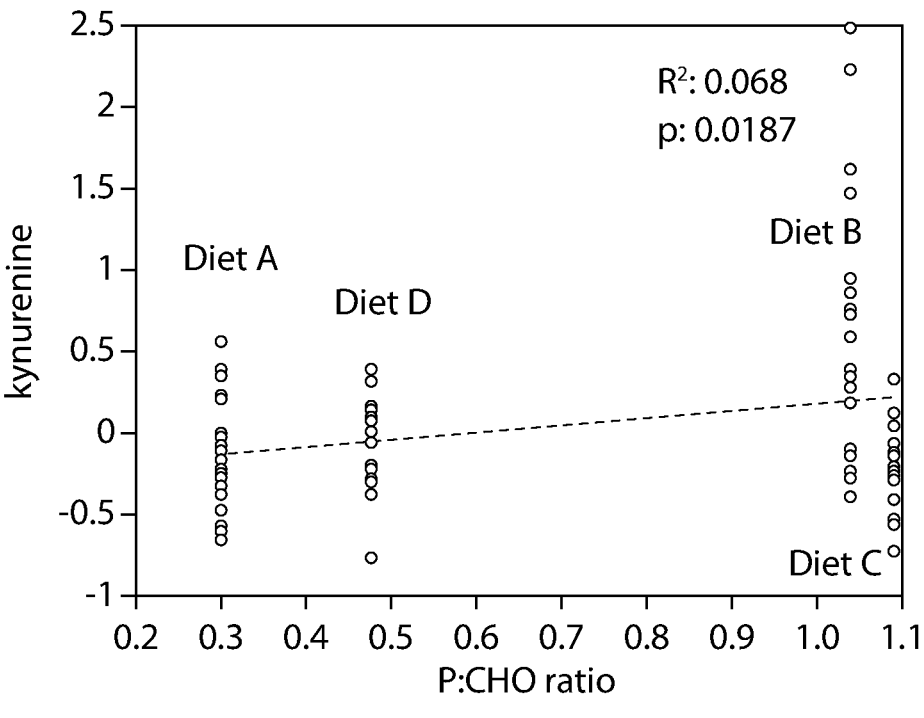
FIG. 6 presents correlation coefficients of dietary macronutrient ratios and fecal metabolite involved in tryptophan metabolism for Diets A to D.
Figure 6B:
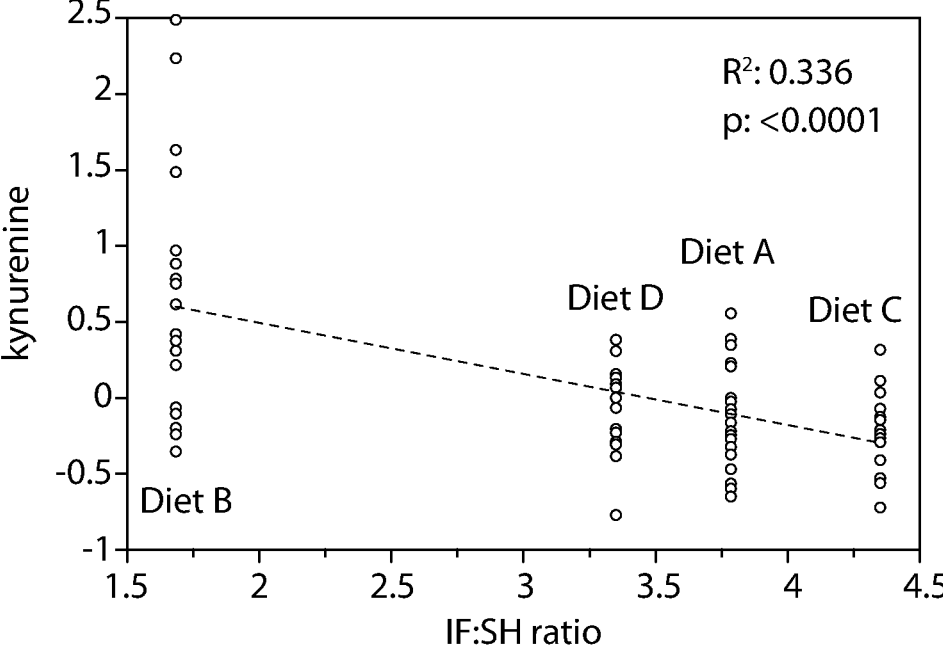

FIG. 6 presents correlation coefficients of dietary macronutrient ratios and fecal metabolite involved in tryptophan metabolism for Diets A to D. FIG. 6(a) shows the abundance of the tryptophan metabolite kynurenine in feces of samples collected from dogs fed with Diet A to D vs. the crude protein to carbohydrate ratio present in those four diets. FIG. 6(b) shows the abundance of the tryptophan metabolite kynurenine in feces of samples collected from dogs fed with Diets A to D vs. the insoluble fiber to soluble fiber ratio present in the four diets.

Figure 7A:
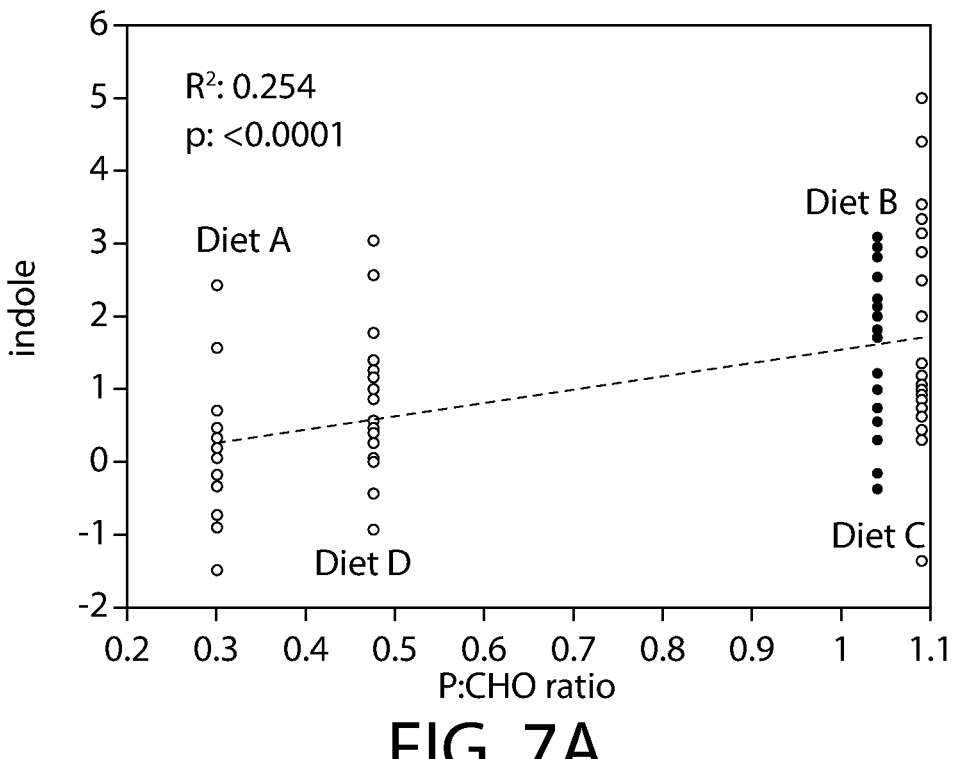
FIG. 7 presents correlation coefficients of dietary macronutrient ratios and fecal metabolite involved in tryptophan metabolism for Diets A to D.
Figure 7B:
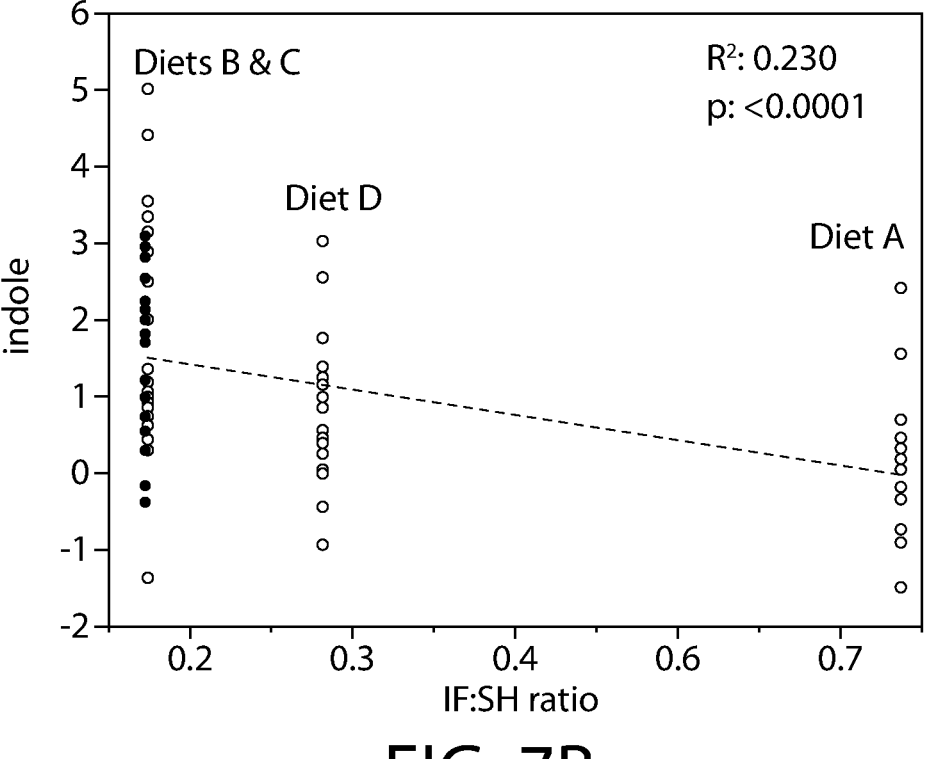

FIG. 7 presents correlation coefficients of dietary macronutrient ratios and fecal metabolite in in tryptophan metabolism for Diets A to D. FIG. 7(a) shows the abundance of indole in feces of samples collected from dogs fed with Diets A to D vs. the crude protein to carbohydrate ratio present in those four diets. FIG. 7(b) shows the abundance of indole is feces of samples collected from dogs fed with Diets A to D vs. the insoluble fiber to soluble fiber ratio present in the four diets.

Figure 8A:
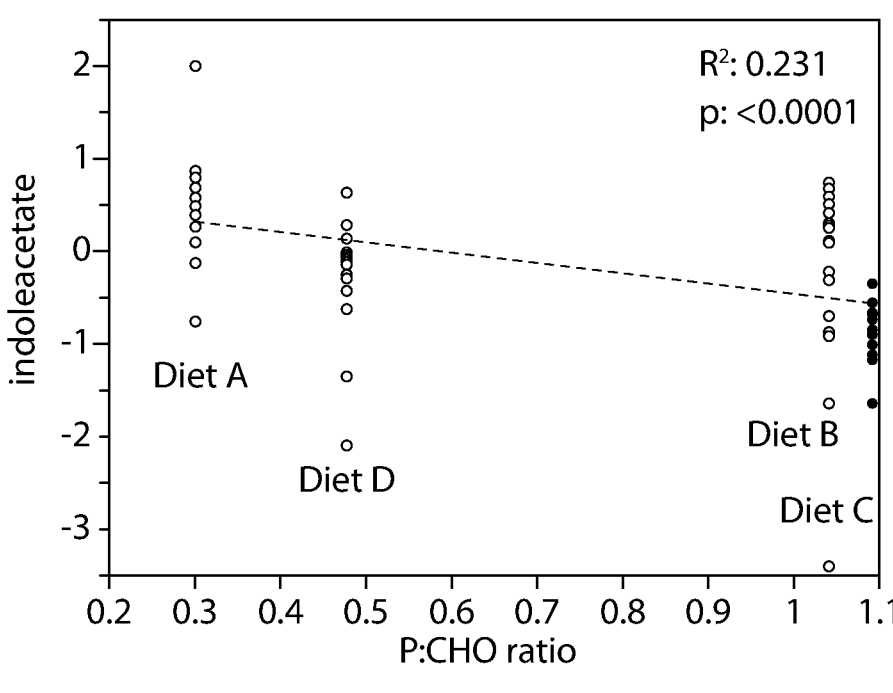
FIG. 8 presents correlation coefficients of dietary macronutrient ratios and fecal metabolite involved in tryptophan metabolism for Diets A to D.
Figure 8B:
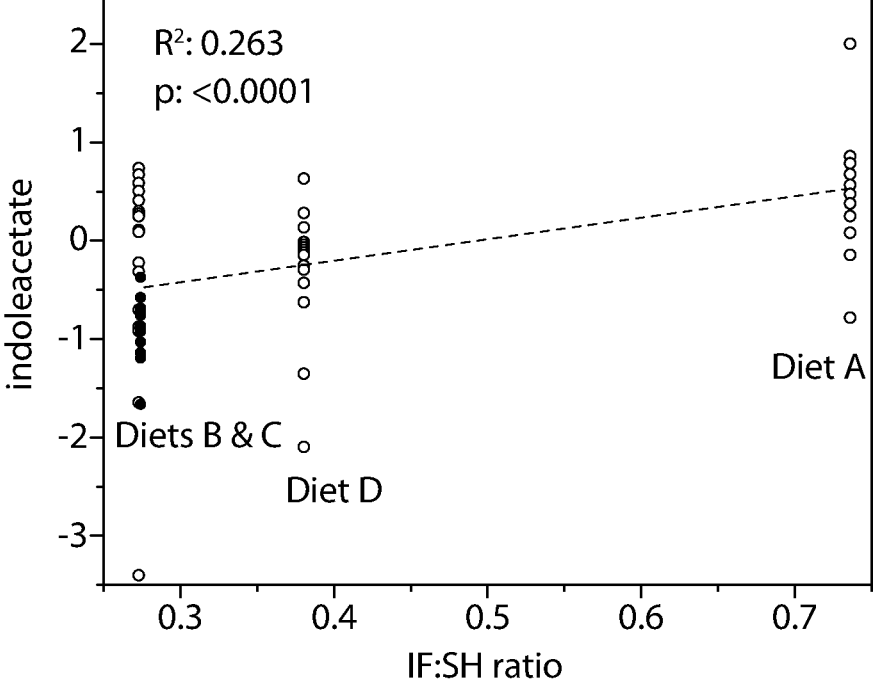

FIG. 8 presents correlation coefficients of dietary macronutrient ratios and fecal metabolite involved in tryptophan metabolism for Diets A to D. FIG. 7(a) shows the abundance of indolacetate in feces of samples collected from dogs fed with Diets A to D vs. the crude protein to carbohydrate ratio present in those four diets. FIG. 7(b) shows the abundance of indolacetate in feces of samples collected from dogs fed with Diets A to D vs. the insoluble fiber to soluble fiber ratio present in the four diets.

Figure 9A:
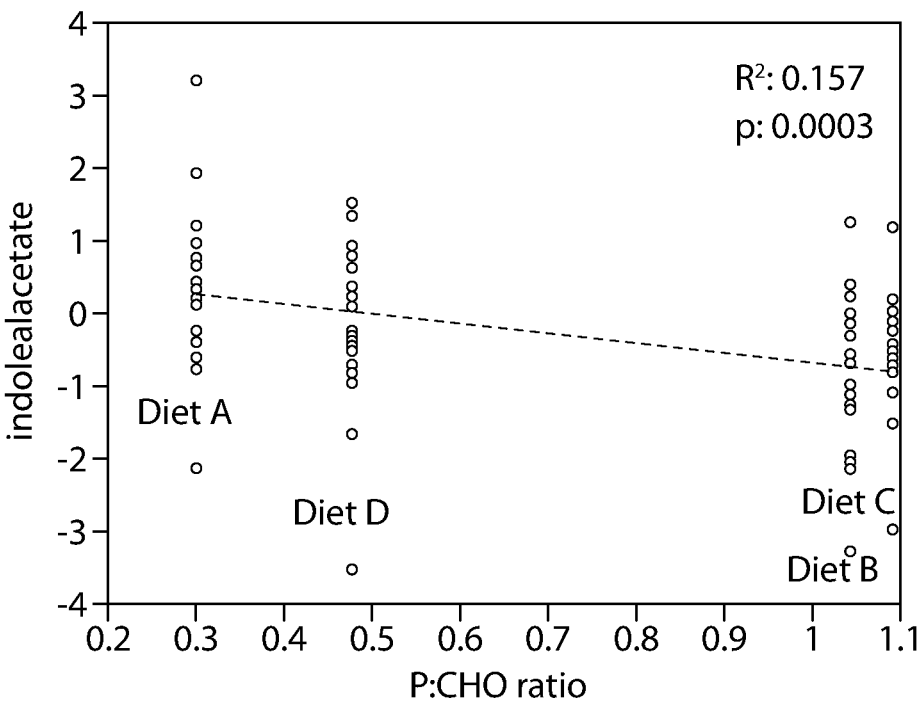
FIG. 9 presents correlation coefficients of dietary macronutrient ratios and fecal metabolite involved in tryptophan metabolism for Diets A to D.
Figure 9B:
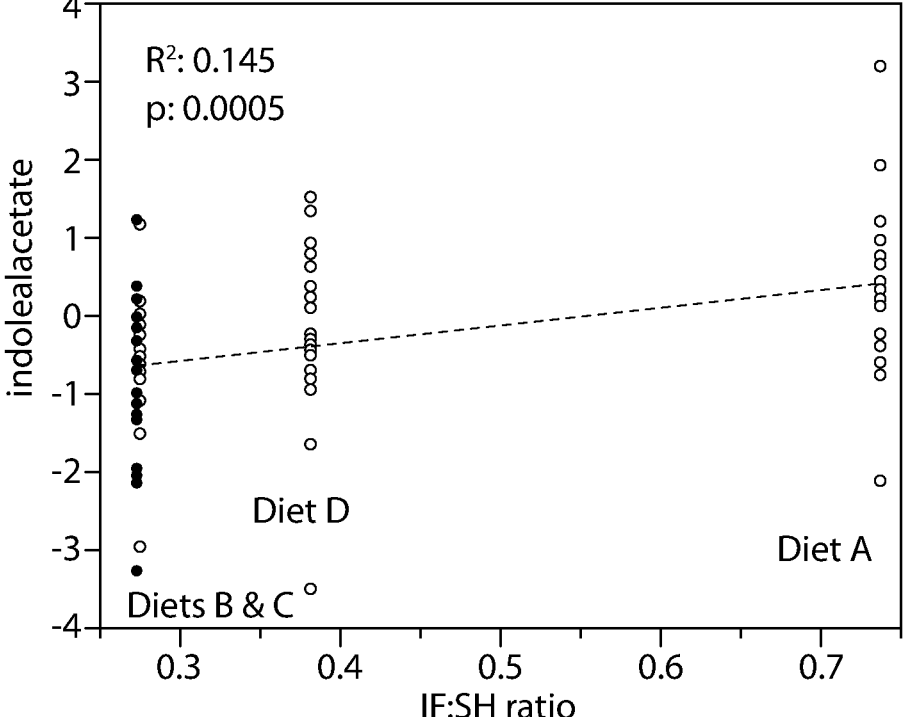

FIG. 9 presents correlation coefficients of dietary macronutrient ratios and fecal metabolite involved in tryptophan metabolism for Diets A to D. FIG. 9(a) shows the abundance of indolepropionate in feces of samples collected from dogs fed with Diets A to D vs. the crude protein to carbohydrate ratio present in those four diets. FIG. 9(b) shows the abundance of indolepropionate in feces of samples collected from dogs fed with Diets A to D vs. the insoluble fiber to soluble fiber ratio present in the four diets.

FIGS. 1 and 2 outline the ability of Diet A fed group shifts tryptophan catabolism by significantly reducing the kynurenine/tryptophan (Ky/Tr) ratio compared with other diets used in this study. The Ky/Tr ratio is considered a measure of IDO1 enzymatic activity which is the first rate limiting step in tryptophan catabolism along the kynurenine pathway. However, there are no significant differences observed on the fecal tryptophan levels between the diets treatments used in this study, though the dietary tryptophan levels varied between the diets (Table 2). Further, Diet significantly reduced the fecal kynurenine levels compared with other diets used in this study as an additional data supportive to observed Ky/Tr ratio as presented in FIG. 2(b).

FIGS. 3 and 4 depict the ability of Diet A fed group to significantly increase the levels of indole derivatives such as indolelactate, indoleacetate and indolepropionate (IPA) compared with other diets used in this study. However, no significant differences were observed on the levels of 3-indoxylsulfate between the diet treatments. 3-indoxylsulfate is considered as a key uremic toxin affects cellular immunity results in vascular endothelial damage and cause cardiovascular diseases in end stage renal disease patients (Kim et al. 2017). Among these indole derivatives, IPA is a potent antioxidant which scavenges radicals without subsequently generating reactive and pro-oxidant intermediate compounds. A recent study showed the higher levels of serum IPA was negatively associated with ADHD behavioral scores in dogs (Puurunen et al. 2016). Further, IPA significantly induces IL-10 production, an anti-inflammatory cytokine protects from colitis. In addition, a study demonstrated that IPA lowers the risk of type-2 diabetes (de Mello et al, 2017).

Dietary factors impact the host tryptophan metabolism. Based on the correlation coefficient analyses, the crude protein to carbohydrate ratio shows significantly positive correlation with the kynurenine to tryptophan ratio and kynurenine levels. However, the insoluble fiber to soluble fiber ratio, as illustrated in FIG. 5, shows significantly negative correlation with the kynurenine to tryptophan ratio and kynurenine levels. Further, crude protein to carbohydrate ratio shows significant negative correlation with indoleacetate and indolepropionate levels, as illustrated in FIGS. 8(a) and 9(a). However, total dietary fiber to crude protein ratio shows significant positive correlation with indoleacetate and indolepropionate levels. Surprisingly, the crude protein to carbohydrate ratio and the total dietary fiber to crude protein ratio shows significant positive and negative correlations with indole levels, respectively (FIG. 7).

Correlation coefficient analyses suggests that crude protein to carbohydrate ratio, insoluble fiber to soluble fiber ratio and the total dietary fiber to crude protein ratio are critical to shift the host tryptophan metabolism to indole pathway to produce indole derivatives such as indolelactate, indoleacetate and indolepropionate.

The results of empirical data presented above suggest that when P:CHO<0.301, the host tryptophan metabolism shifts from kynurenine pathway to indole pathway to produce indole derivatives.

Further, the results of empirical data presented above suggest that when IF:SF>3.78, the host tryptophan metabolism shifts from kynurenine pathway to indole pathway to produce indole derivatives.

Further, the results of empirical data presented above suggest that when TDF:P>0.737, the host tryptophan metabolism shifts from kynurenine pathway to indole pathway to produce indole derivatives.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:
1. A pet food composition comprising:
crude protein,
carbohydrate, and
dietary fiber comprising insoluble fiber and soluble fiber,

24 wherein the weight ratio of crude protein to carbohydrate is between about 0.25:1 and about 0.40:1, the weight ratio of insoluble fiber to soluble fiber is between about 3.5:1 and about 10:1, and the weight ratio of total dietary fiber to crude protein is between about 0.70:1 and about 2.0:1;
wherein the pet food composition is a nutritionally complete pet food composition; and
wherein the composition shifts the intestinal tryptophan metabolism of an animal from kynurenine pathway to indole pathway to produce indole derivatives.
2. The pet food composition according to claim 1, wherein the weight ratio of crude protein to carbohydrate is between about 0.30:1 and about 0.40:1.
3. The pet food composition according to claim 1, wherein the weight ratio of insoluble fiber to soluble fiber is between about 3.5:1 and about 6.0:1.
4. The pet food composition of claim 3, wherein the weight ratio of insoluble fiber to soluble fiber is between about 3.5:1 and about 5.0:1.
5. The pet food composition according to claim 1, wherein the weight ratio of total dietary fiber to crude protein is between about 0.70:1 and about 1.0:1.
6. The pet food composition according to claim 1, wherein the weight ratio of crude protein to carbohydrate is between about 0.30:1 and about 0.40:1, the weight ratio of insoluble fiber to soluble fiber is between about 3.5:1 and about 6.0:1, and the weight ratio of total dietary fiber to crude protein is between about 0.70:1 and about 0.90:1.
7. The pet food composition according to claim 1, wherein said pet food composition is a dry pet food.
8. The pet food composition of claim 1, wherein the carbohydrate is obtained from a carbohydrate source comprising one or more of corn, wheat, distiller's dried grain, corn starch, rice, corn gluten meal, or combinations thereof.
9. The pet food composition of claim 1, wherein the crude protein is obtained from a protein source comprising one or more of meat, meat-by-product, seafood, dairy products, egg, or combinations thereof.
10. The pet food composition of claim 1, further comprising an ingredient, the ingredient comprising one or more of crude fat, crude fiber, moisture, or combinations thereof.
11. The pet food composition of claim 10, wherein the crude fat is supplied by a sources selected from meat and meat by-products.
12. The pet food composition of claim 1, wherein the pet food composition is a wet pet food.
13. A method of treating irritable bowel syndrome, metabolic syndrome, cardiovascular disorder, or attention deficit hyperactivity disorder, in a companion animal in need thereof, the method comprising administering to the companion animal a pet food comprising an effective amount of the pet food composition comprising:
crude protein,
carbohydrate, and
dietary fiber comprising insoluble fiber and soluble fiber,
wherein the weight ratio of crude protein to carbohydrate is between about 0.25:1 and about 0.40:1, the weight ratio of insoluble fiber to soluble fiber is between about 3.5:1 and about 10:1, and the weight ratio of total dietary fiber to crude protein is between about 0.70:1 and about 2.0:1, and
wherein the pet food composition is nutritionally complete.

14. The method of claim 13, wherein the cardiovascular disorder is selected from heart disease, heart failure, and abnormalities of the cardiovascular system.

\* \* \* \* \*